US012795436B2

(12) United States Patent
Ozturk et al.

(10) Patent No.: US 12,795,436 B2
(45) Date of Patent: Nov. 10, 2026

(54) ENHANCED DECODING FEEDBACK FOR TRAFFIC TYPE DIFFERENTIATION

(71) Applicant: QUALCOMM Incorporated, San Diego, CA (US)

(72) Inventors: Ozcan Ozturk, San Diego, CA (US); Yi Huang, San Diego, CA (US); Konstantinos Dimou, New York, NY (US); Wanshi Chen, San Diego, CA (US); Tao Luo, San Diego, CA (US); Xiaoxia Zhang, San Diego, CA (US); Jing Sun, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 388 days.

(21) Appl. No.: 18/248,227

(22) PCT Filed: Sep. 29, 2021

(86) PCT No.: PCT/US2021/052715

§ 371 (c)(1),
(2) Date: Apr. 6, 2023

(87) PCT Pub. No.: WO2022/093470

PCT Pub. Date: May 5, 2022

(65) Prior Publication Data

US 2023/0379750 A1 Nov. 23, 2023

(30) Foreign Application Priority Data

Oct. 29, 2020 (GR) .............................. 20200100655

(51) Int. Cl.

| | |
|---|---|
| ***H04W 28/02*** | (2009.01) |
| ***H04L 1/1607*** | (2023.01) |
| ***H04L 47/2441*** | (2022.01) |

(52) U.S. Cl.
CPC ....... *H04W 28/0268* (2013.01); *H04L 1/1671* (2013.01); *H04L 47/2441* (2013.01)

(58) Field of Classification Search
CPC ........... H04W 28/0268; H04L 47/2441; H04L 1/1671; H04L 1/0026; H04L 1/0027; H04L 1/0031; H04L 1/203

(Continued)

(56) References Cited

U.S. PATENT DOCUMENTS

| | | | |
|---|---|---|---|
| 8,687,607 | B2 | 4/2014 | Casaccia et al. |
| 9,232,537 | B2 | 1/2016 | Damnjanovic et al. |

(Continued)

FOREIGN PATENT DOCUMENTS

| | | | |
|---|---|---|---|
| CN | 111435867 | A | 7/2020 |
| CN | 111436128 | A | 7/2020 |

(Continued)

OTHER PUBLICATIONS

5G; NR; Physical channels and modulation (3GPP TS 38.211 version 16.2.0 Release 16) NR; Physical channels and modulation (Year: 2020).*

(Continued)

*Primary Examiner* — Christopher M Crutchfield
*Assistant Examiner* — Syed Ahmed
(74) *Attorney, Agent, or Firm* — Holland & Hart LLP

(57) ABSTRACT

Methods, systems, and devices for wireless communications are described. A user equipment (UE) may communicate with a base station as part of a wireless communications system. The UE may receive a downlink message from a base station. The UE may perform a decoding procedure for the received downlink message. The UE may determine the downlink message has a traffic type associated with a quality of service level. The UE may determine to transmit enhanced feedback with an acknowledgment message (posi- (Continued)

tive or negative) indicating the result of the decoding procedure for the received downlink message, in cases where the downlink message is of the first traffic type. The enhanced feedback may indicate assistance information associated with a quality of service level for the received downlink message. The UE may then transmit the enhanced feedback for the acknowledgment message.

28 Claims, 15 Drawing Sheets

(58) Field of Classification Search
USPC .......................................................... 370/235
See application file for complete search history.

(56) References Cited

U.S. PATENT DOCUMENTS

| | | | | |
|---|---|---|---|---|
| 10,306,606 | B2 | 5/2019 | Damnjanovic et al. | |
| 10,743,338 | B2 | 8/2020 | Hosseini et al. | |
| 12,004,163 | B2 * | 6/2024 | Yeo | H04L 1/1896 |
| 12,035,314 | B2 * | 7/2024 | Li | H04L 5/0007 |
| 2017/0332400 | A1 | 11/2017 | Kowalski et al. | |
| 2019/0165893 | A1 * | 5/2019 | Khosravirad | H03M 13/6306 |
| 2020/0008156 | A1 * | 1/2020 | Yin | H04L 1/1858 |
| 2020/0136763 | A1 * | 4/2020 | Lee | H04L 1/0031 |
| 2021/0100061 | A1 * | 4/2021 | Park | H04W 76/25 |
| 2021/0243782 | A1 * | 8/2021 | Miao | H04L 5/0091 |
| 2021/0345373 | A1 * | 11/2021 | Li | H04L 5/0053 |
| 2022/0007399 | A1 * | 1/2022 | Rastegardoost | H04L 1/1861 |

FOREIGN PATENT DOCUMENTS

| | | | |
|---|---|---|---|
| EP | 3902171 | A1 | 10/2021 |
| WO | WO-2005036917 | | 4/2005 |
| WO | WO-2007092896 | | 8/2007 |
| WO | WO-2017200879 | | 11/2017 |
| WO | WO-2018175396 | | 9/2018 |
| WO | WO-2019236201 | A1 | 12/2019 |
| WO | WO-2020143839 | A1 | 7/2020 |

OTHER PUBLICATIONS

5G; NR; Multiplexing and channel coding (3GPP TS 38.212 version 15.9.0 Release 15) NR; Multiplexing and channel coding (Year: 2020).*

Title 5G; NR; Physical layer procedures for data (3GPP TS 38.214 version 15.10.0 Release 15) NR; Physical layer procedures for data (Year: 2020).*

5G; NR; Medium Access Control (MAC) protocol specification (3GPP TS 38.321 version 16.1.0 Release 16) NR; Medium Access Control (MAC) protocol specification (Year: 2020).*

Taiwan Search Report—TW110136708—TIPO—Jun. 5, 2025.

International Search Report and Written Opinion—PCT/US2021/052715—ISA/EPO—Jan. 26, 2022.

Qualcomm Incorporated: "HARQ-ACK enhancement for IOT and URLLC", R1-2006799, 3GPP TSG RAN WG1 #102-e, e-Meeting, Aug. 17-28, 2020, May 19, 2025, 15 Pages.

Anand A., et al., "Resource Allocation and HARQ Optimization for URLLC Traffic in 5G Wireless Networks", IEEE Journal on Selected Areas in Communications, vol. 36, No. 11, Nov. 2018, Dec. 31, 2018, pp. 2411-2421.

Wang J., et al., "Research on CDMA2000/WLAN Network Access Control Algorithm Based on Location Information", China Excellent Master's Thesis Full-Text Database, Apr. 15, 2014, pp. 1-81.

Pocovi G., et al., "Channel Quality Feedback Enhancements for Accurate URLLC Link Adaptation in 5G Systems", IEEE, Jun. 30, 2020, 6 Pages.

* cited by examiner

ENHANCED DECODING FEEDBACK FOR TRAFFIC TYPE DIFFERENTIATION

CROSS REFERENCE

The present application is a 371 national stage filing of International PCT Application No. PCT/US2021/052715 by Ozturk et al. entitled "ENHANCED DECODING FEEDBACK FOR TRAFFIC TYPE DIFFERENTIATION," filed Sep. 29, 2021; and claims priority to Greece Patent Application No. 20200100655 by Ozturk et al., entitled "ENHANCED DECODING FEEDBACK FOR TRAFFIC TYPE DIFFERENTIATION," filed Oct. 29, 2020, each of which is assigned to the assignee hereof, and each of which is expressly incorporated by reference in its entirety herein.

FIELD OF TECHNOLOGY

The following relates to wireless communications, including enhanced decoding feedback for traffic type differentiation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive and attempt to decode packets received from another wireless device, such as a base station. Based on the success of the reception and decoding, the UE may transmit positive acknowledgment (ACK) messages or negative acknowledgment (NACK) messages to the base station. In some cases, the received packets may be packets of a particular type of traffic, such as ultra-reliable low-latency communication (URLLC), which may correspond to a threshold level of error.

SUMMARY

The described techniques relate to improved methods, systems, devices, and apparatuses that support enhanced decoding feedback for traffic type differentiation. Generally, the described techniques provide for a user equipment (UE) transmitting enhanced feedback in addition to hybrid automatic repeat request (HARQ) feedback, in cases of downlink messages received from a base station that are of a first traffic type, such as ultra-reliable low-latency communication (URLLC). The UE may receive a downlink message from a base station. The UE may perform a decoding procedure for the received downlink message. The UE may determine a traffic type for the downlink message, the traffic type being a first traffic type (e.g., URLLC) or a second traffic type (e.g., enhanced mobile broadband (eMBB), massive machine type communications (mMTC)). The UE may determine to transmit enhanced feedback with an acknowledgment message (e.g., a positive acknowledgment message (ACK) or a negative acknowledgment message (NACK)) indicating the result of the decoding procedure for the received downlink message, in cases where the downlink message is of the first traffic type. The enhanced feedback may indicate channel quality information for the received downlink message. The UE may then transmit the ACK message and the enhanced feedback for the ACK message together with the ACK message.

A method for wireless communications at a user equipment (UE) is described. The method may include receiving a downlink message from a base station, performing a decoding procedure for the received downlink message, determining the downlink message has a traffic type associated with a quality of service level, determining, based on the traffic type, to transmit enhanced feedback with an acknowledgment message indicating a result of the performed decoding procedure for the received downlink message, the enhanced feedback indicating assistance information associated with the quality of service level for the received downlink message, and transmitting the acknowledgment message and the enhanced feedback for the acknowledgment message.

An apparatus for wireless communications at a UE is described. The apparatus may include a processor, memory coupled with the processor, and instructions stored in the memory. The instructions may be executable by the processor to cause the apparatus to receive a downlink message from a base station, perform a decoding procedure for the received downlink message, determine the downlink message has a traffic type associated with a quality of service level, determine, based on the traffic type, to transmit enhanced feedback with an acknowledgment message indicating a result of the performed decoding procedure for the received downlink message, the enhanced feedback indicating assistance information associated with the quality of service level for the received downlink message, and transmit the acknowledgment message and the enhanced feedback for the acknowledgment message.

Another apparatus for wireless communications at a UE is described. The apparatus may include means for receiving a downlink message from a base station, means for performing a decoding procedure for the received downlink message, means for determining the downlink message has a traffic type associated with a quality of service level, means for determining, based on the traffic type, to transmit enhanced feedback with an acknowledgment message indicating a result of the performed decoding procedure for the received downlink message, the enhanced feedback indicating assistance information associated with the quality of service level for the received downlink message, and means for transmitting the acknowledgment message and the enhanced feedback for the acknowledgment message.

A non-transitory computer-readable medium storing code for wireless communications at a UE is described. The code may include instructions executable by a processor to receive a downlink message from a base station, perform a decoding procedure for the received downlink message, determine the downlink message has a traffic type associated with a quality of service level, determine, based on the traffic type type, to transmit enhanced feedback with an acknowledgment message indicating a result of the performed decoding procedure for the received downlink message, the enhanced feedback indicating assistance information associated with the quality of service level for the received downlink message, and transmit the acknowledgment message and the enhanced feedback for the acknowledgment message.

In some examples of the method, apparatuses, and non-transitory computer-readable medium described herein, the assistance information includes channel quality information, or an estimated error rate, or a combination thereof.

In some examples of the method, apparatuses, and non-transitory computer-readable medium described herein, the traffic type may be different from a second traffic type, the second traffic type associated with a type of enhanced feedback that may be different from the enhanced feedback associated with the acknowledgment message.

Some examples of the method, apparatuses, and non-transitory computer-readable medium described herein may further include operations, features, means, or instructions for determining, based on the result of the performed decoding procedure, whether to transmit the enhanced feedback in a first layer transmission or a second layer transmission.

Some examples of the method, apparatuses, and non-transitory computer-readable medium described herein may further include operations, features, means, or instructions for transmitting the enhanced feedback in the first layer based on the acknowledgment message being a negative acknowledgment message.

Some examples of the method, apparatuses, and non-transitory computer-readable medium described herein may further include operations, features, means, or instructions for transmitting the enhanced feedback in the second layer based on the acknowledgment message being a positive acknowledgment message.

In some examples of the method, apparatuses, and non-transitory computer-readable medium described herein, the first layer may be a physical layer and the second layer may be a medium access control layer.

Some examples of the method, apparatuses, and non-transitory computer-readable medium described herein may further include operations, features, means, or instructions for transmitting periodically, for downlink messages of the traffic type, enhanced feedback indicating assistance information associated with the quality of service level.

Some examples of the method, apparatuses, and non-transitory computer-readable medium described herein may further include operations, features, means, or instructions for transmitting, for each downlink message received from the base station, an enhanced feedback associated with the downlink message.

Some examples of the method, apparatuses, and non-transitory computer-readable medium described herein may further include operations, features, means, or instructions for receiving an indication of a periodic configuration for transmitting enhanced feedback, where the enhanced feedback associated with the downlink message may be transmitted according to the periodic configuration.

Some examples of the method, apparatuses, and non-transitory computer-readable medium described herein may further include operations, features, means, or instructions for receiving an indication to activate the periodic configuration, where the enhanced feedback associated with the downlink message may be transmitted according to the periodic configuration based on the received indication to activate the periodic configuration.

Some examples of the method, apparatuses, and non-transitory computer-readable medium described herein may further include operations, features, means, or instructions for receiving the indication to activate the periodic configuration includes receiving a downlink control information message or a medium access control control element including the indication to activate the periodic configuration.

Some examples of the method, apparatuses, and non-transitory computer-readable medium described herein may further include operations, features, means, or instructions for determining that a trigger condition may be satisfied and transmitting the enhanced feedback based on determining that the trigger condition may be satisfied.

Some examples of the method, apparatuses, and non-transitory computer-readable medium described herein may further include operations, features, means, or instructions for determining that an error rate threshold for the traffic type may be satisfied, where the trigger condition includes the determining that the error rate threshold may be satisfied.

Some examples of the method, apparatuses, and non-transitory computer-readable medium described herein may further include operations, features, means, or instructions for transmitting the enhanced feedback based on determining that the error rate threshold may be satisfied, where the error rate threshold indicates a downlink message with a lowest error rate.

Some examples of the method, apparatuses, and non-transitory computer-readable medium described herein may further include operations, features, means, or instructions for receiving, from the base station, a request for the UE to transmit enhanced feedback and determining that the trigger condition may be satisfied based on the received request.

Some examples of the method, apparatuses, and non-transitory computer-readable medium described herein may further include operations, features, means, or instructions for receiving a downlink control information message from the base station and determining the traffic type based on the quality of service level indicated by the downlink control information message.

In some examples of the method, apparatuses, and non-transitory computer-readable medium described herein, the enhanced feedback includes an indication of the quality of service level indicated by the downlink control information message.

Some examples of the method, apparatuses, and non-transitory computer-readable medium described herein may further include operations, features, means, or instructions for determining a quality of service level for each logical channel of a set of multiple logical channels multiplexed in the downlink message and determining the traffic type based on a highest quality of service level among the determined quality of service levels.

Some examples of the method, apparatuses, and non-transitory computer-readable medium described herein may further include operations, features, means, or instructions for identifying a first set of resources for enhanced feedbacks of the traffic type, and a second set of resources for feedback messages of a second traffic type and transmitting the enhanced feedback on the first set of resources.

In some examples of the method, apparatuses, and non-transitory computer-readable medium described herein, the enhanced feedback includes an indication of the traffic type.

In some examples of the method, apparatuses, and non-transitory computer-readable medium described herein, the indication includes a logical channel identifier, a quality of service flow identifier, a fifth-generation quality of service identifier, or a combination thereof.

Some examples of the method, apparatuses, and non-transitory computer-readable medium described herein may further include operations, features, means, or instructions for transmitting the indication in a medium access control layer.

A method for wireless communications at a base station is described. The method may include transmitting, to a UE, a downlink message associated with a quality of service level and receiving, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

An apparatus for wireless communications at a base station is described. The apparatus may include a processor, memory coupled with the processor, and instructions stored in the memory. The instructions may be executable by the processor to cause the apparatus to transmit, to a UE, a downlink message associated with a quality of service level and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

Another apparatus for wireless communications at a base station is described. The apparatus may include means for transmitting, to a UE, a downlink message associated with a quality of service level and means for receiving, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

A non-transitory computer-readable medium storing code for wireless communications at a base station is described. The code may include instructions executable by a processor to transmit, to a UE, a downlink message associated with a quality of service level and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

In some examples of the method, apparatuses, and non-transitory computer-readable medium described herein, the assistance information includes channel quality information, or an estimated error rate, or a combination thereof.

In some examples of the method, apparatuses, and non-transitory computer-readable medium described herein, the traffic type may be different from a second traffic type, the second traffic type associated with a second type of enhanced feedback that may be different from the enhanced feedback.

Some examples of the method, apparatuses, and non-transitory computer-readable medium described herein may further include operations, features, means, or instructions for receiving the enhanced feedback in a first layer transmission or a second layer transmission.

Some examples of the method, apparatuses, and non-transitory computer-readable medium described herein may further include operations, features, means, or instructions for receiving the enhanced feedback in the first layer, where the acknowledgment message may be a negative acknowledgment message.

Some examples of the method, apparatuses, and non-transitory computer-readable medium described herein may further include operations, features, means, or instructions for receiving the enhanced feedback in the second layer, where the acknowledgment message may be a positive acknowledgment message.

In some examples of the method, apparatuses, and non-transitory computer-readable medium described herein, the first layer may be a physical layer and the second layer may be a medium access control layer.

Some examples of the method, apparatuses, and non-transitory computer-readable medium described herein may further include operations, features, means, or instructions for receiving periodically, for downlink messages of the traffic type, enhanced feedbacks indicating assistance information associated with the quality of service level.

Some examples of the method, apparatuses, and non-transitory computer-readable medium described herein may further include operations, features, means, or instructions for receiving, for each downlink message transmitted by the base station, enhanced feedback associated with the downlink message.

Some examples of the method, apparatuses, and non-transitory computer-readable medium described herein may further include operations, features, means, or instructions for transmitting an indication of a periodic configuration for transmitting enhanced feedback, where the enhanced feedback associated with the downlink message may be received according to the periodic configuration.

Some examples of the method, apparatuses, and non-transitory computer-readable medium described herein may further include operations, features, means, or instructions for transmitting an indication to activate the periodic configuration, where the enhanced feedback associated with the downlink message may be received according to the periodic configuration based on the received indication to activate the periodic configuration.

Some examples of the method, apparatuses, and non-transitory computer-readable medium described herein may further include operations, features, means, or instructions for transmitting the indication to activate the periodic configuration includes transmitting a downlink control information message or a medium access control control element including the indication to activate the periodic configuration.

Some examples of the method, apparatuses, and non-transitory computer-readable medium described herein may further include operations, features, means, or instructions for receiving the enhanced feedback based on a satisfaction of a trigger condition.

In some examples of the method, apparatuses, and non-transitory computer-readable medium described herein, the trigger condition may be an error rate threshold.

In some examples of the method, apparatuses, and non-transitory computer-readable medium described herein, the error rate threshold indicates the downlink message with a lowest error rate.

Some examples of the method, apparatuses, and non-transitory computer-readable medium described herein may further include operations, features, means, or instructions for transmitting to the UE, a request for the UE to transmit enhanced feedback, where the trigger condition includes the request.

Some examples of the method, apparatuses, and non-transitory computer-readable medium described herein may further include operations, features, means, or instructions for transmitting a downlink control information message to the UE, where the quality of service level of the traffic type may be indicated by the downlink control information message.

In some examples of the method, apparatuses, and non-transitory computer-readable medium described herein, the enhanced feedback includes an indication of the quality of service level indicated by the downlink control information message.

Some examples of the method, apparatuses, and non-transitory computer-readable medium described herein may further include operations, features, means, or instructions for receiving the enhanced feedback on a first set of resources, where the first set of resources correspond to the traffic type, where the first set of resources may be different from a second set of resources for enhanced feedbacks of a second traffic type.

In some examples of the method, apparatuses, and non-transitory computer-readable medium described herein, the enhanced feedback includes an indication of the traffic type.

In some examples of the method, apparatuses, and non-transitory computer-readable medium described herein, the indication includes a logical channel identifier, a quality of service flow identifier, a fifth-generation quality of service identifier, or a combination thereof.

Some examples of the method, apparatuses, and non-transitory computer-readable medium described herein may further include operations, features, means, or instructions for receiving the indication in a medium access control layer.

DETAILED DESCRIPTION

A user equipment (UE) may communication with other wireless devices, such as a base station, in a wireless communication system. The UE and a base station may transmit and receive messages to communicate. The base station may transmit a downlink message to the UE, which the UE may attempt to receive and decode. Based on whether or not the UE successfully receives and decodes the message, the UE may transmit feedback to the base station. The feedback may be an example of hybrid automatic repeat request (HARQ) feedback. In cases of successful reception and decoding of the message, the UE may transmit a positive acknowledgement message (ACK) to the base station for the received message. In some cases, the UE may not successfully receive and decode the message, and as a result, the UE may transmit a negative acknowledgement message (NACK) to the base station. If the base station transmitting the message receives a NACK, the device may retransmit the message to the UE. In some circumstances, such as for ultra-reliable low-latency communication (URLLC), it may be beneficial for the UE to include additional information with the acknowledgment message, such as an expected error rate.

A UE may be configured to communicate using different traffic types (e.g., different quality of service (QoS) levels) for different data messages, such as URLLC, enhanced mobile broadband (eMBB), or massive machine type communications (mMTC). The enhanced feedback (e.g., information about the error rate or channel quality) may be used in cases of URLLC data messages (e.g., high priority communications). In some cases, the enhanced feedback may not be used for some types of traffic, such as eMBB or mMTC (e.g., low priority communications). Thus, the UE may determine the type of traffic received in a data message from a base station, and the UE may determine whether to transmit the enhanced feedback. The UE may determine how to transmit the enhanced feedback (e.g., what to send in the feedback, how often to send feedback) based on the determined type of traffic.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to enhanced decoding feedback for traffic type differentiation.

Figure 1:
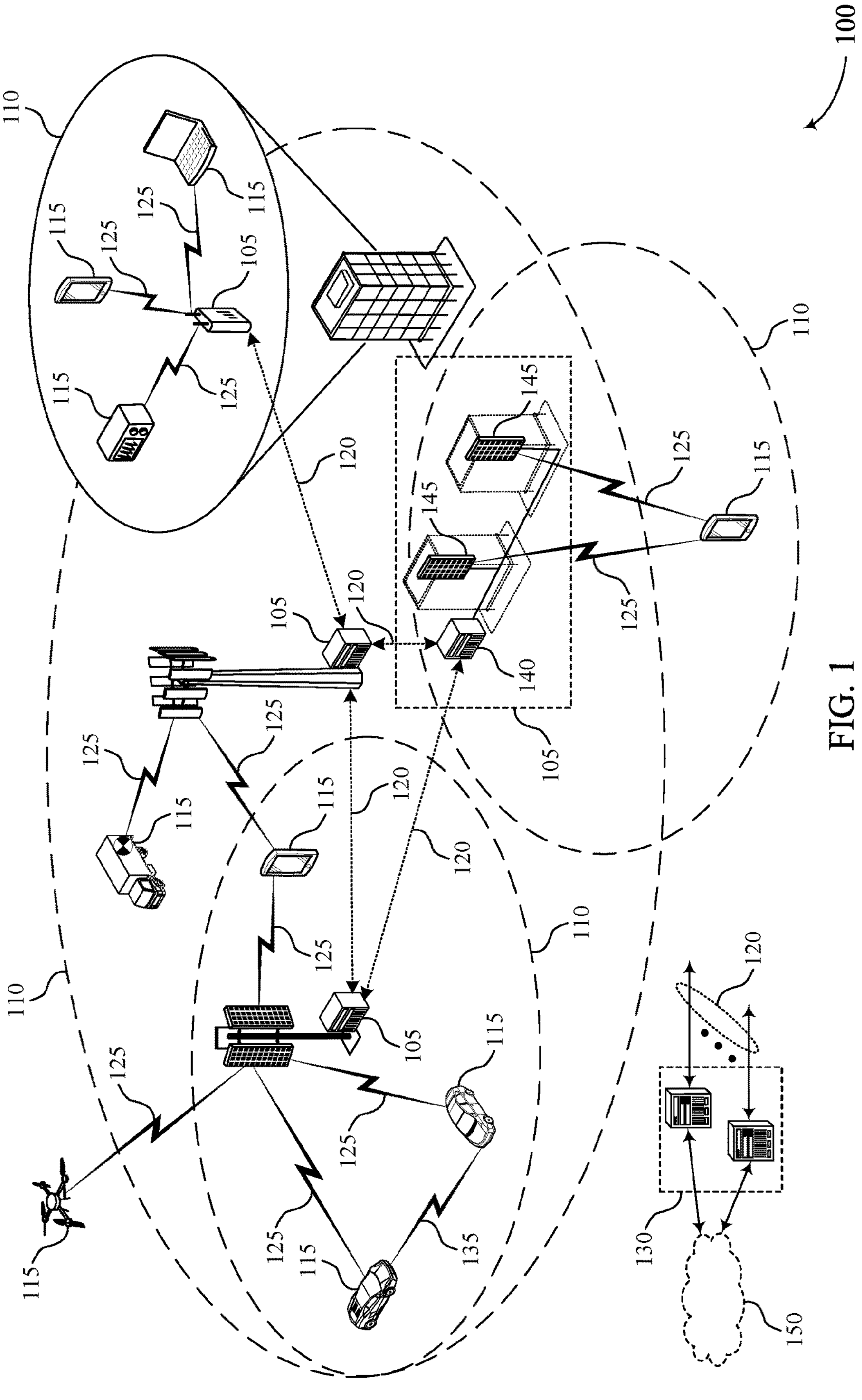
FIG. 1 illustrates an example of a wireless communications system that supports enhanced decoding feedback for traffic type differentiation in accordance with aspects of the present disclosure.

FIG. 1 illustrates an example of a wireless communications system 100 that supports enhanced decoding feedback for traffic type differentiation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be configured to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may be referred to as a unit, a station, a terminal, or a client, among other examples. A UE 115 may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be configured to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may be configured to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or may not be configured or positioned to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a downlink message from a base station 105. The UE 115 may perform a decoding procedure for the received downlink message. The UE 115 may determine a traffic type for the downlink message, the traffic type being a first traffic type or a second traffic type, where the first traffic type is associated with a lower error rate or a lower latency, or both, than the second traffic type. The UE 115 may determine to transmit enhanced feedback with an acknowledgment message (e.g., and an ACK or a NACK) indicating the result of the decoding procedure for the received downlink message, in cases where the downlink message is of the first traffic type. The enhanced feedback may indicate assistance information associated with a quality of service level, for example channel quality information or an estimated error rate, for the received downlink message. The UE 115 may then transmit, to the base station 105, the acknowledgment message and the enhanced feedback for the acknowledgment message together with the acknowledgment message.

Figure 2:
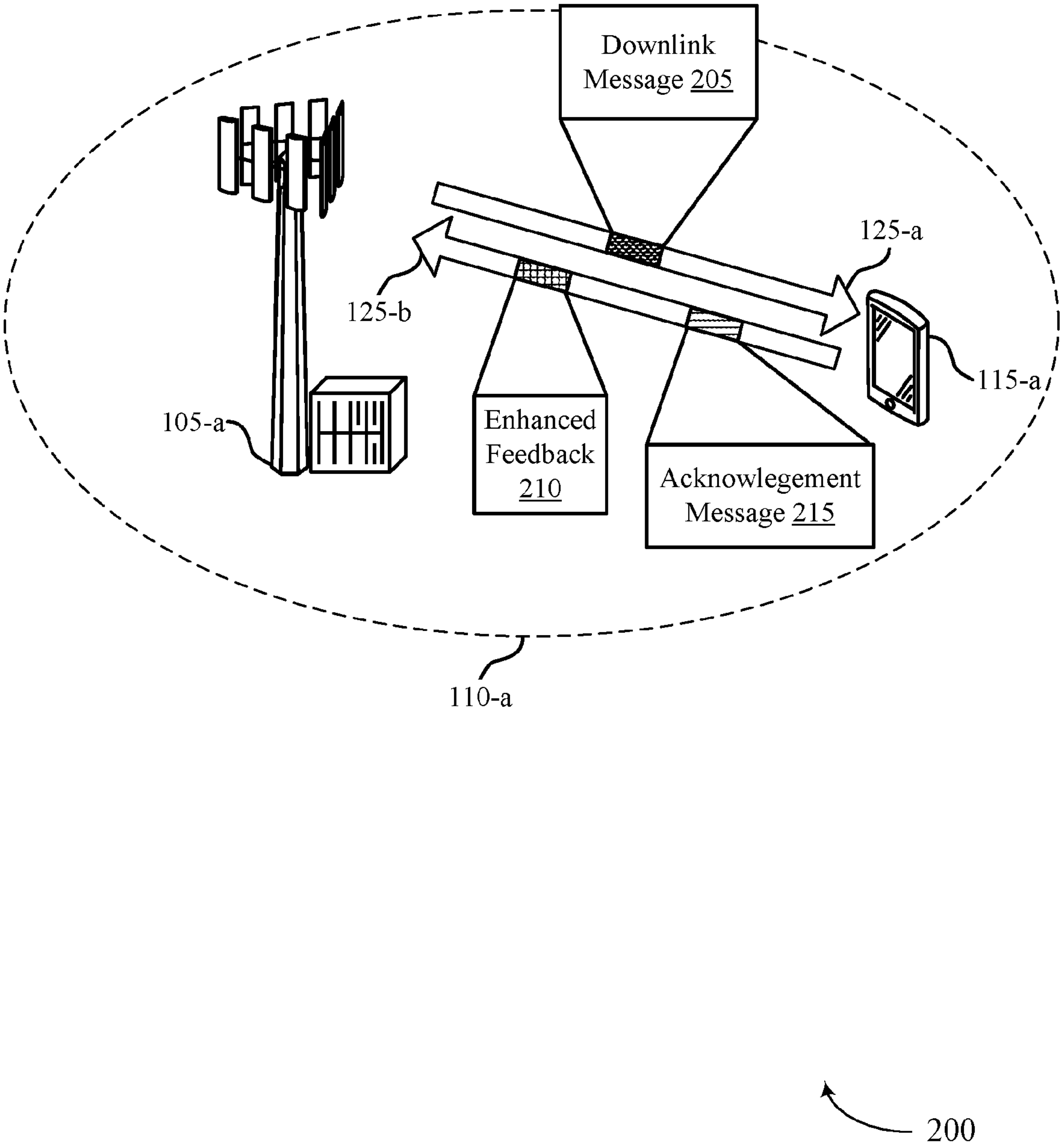
FIG. 2 illustrates an example of a wireless communications system that supports enhanced decoding feedback for traffic type differentiation in accordance with aspects of the present disclosure.

FIG. 2 illustrates an example of a wireless communications system 200 that supports enhanced decoding feedback for traffic type differentiation in accordance with aspects of the present disclosure. In some examples, wireless communications system 200 may implement aspects of wireless communication system 100. UE 115-*a* may be an example of a UE 115 as described with respect to FIG. 1. Base station 105-*a* may be an example of a base station 105 as described with respect to FIG. 1. Base station 105-*a* may serves UEs 115, including UE 115-*a*, within coverage area 110-*a*. Base station 105-*a* may transmit messages to UE 115-*a* over communication link 125-*a*. UE 115-*a* may receive message from base station 105-*a*. UE 115-*a* may communicate with base station 105-*a* by transmitting messages over communication link 125-*b*. Base station 105-*a* may receive these messages.

Base station 105-*a* may transmit one or more downlink messages 205 to UE 115-*a* over communication link 125-*a*. The downlink message 205 may be of a particular traffic type. Base station 105-*a* may transmit downlink message 205 that is a traffic type that corresponds to an ultra-reliable communication QoS level, a low-latency QoS level, a URLLC communication level, or another type of high QoS, low error rate, or low delay or latency communication traffic type, or a combination of these.

UE 115-*a* may receive the downlink message 205, and attempt to decode the downlink message 205. UE 115-*a* may identify whether UE 115-*a* successfully received and decoded downlink message 205. UE 115-*a* may determine to transmit a feedback message, such as acknowledgment message 215, based on whether or not the reception and decoding of downlink message 205 was successful. The acknowledgment message 215 may indicate whether or not the UE 115 successfully received and decoded the downlink transmissions. The acknowledgment message 215 may be in the form of HARQ ACK/NACK feedback bits. ACK feedback bits may indicate that UE 115-*a* successfully received and decoded data in the downlink message 205. NACK feedback bits may indicate that UE 115-*a* did not successfully receive or decode the data in the downlink transmissions. In some cases, the HARQ ACK/NACK feedback occasions may be semi-statically configured, and in other cases the HARQ ACK/NACK feedback occasions may be dynamically configured.

In some examples, UE 115-*a* may determine the traffic type of downlink message 205. The traffic type may correspond to a QoS level of downlink message 205. UE 115-*a* may determine whether downlink message 205 is of a first traffic type or a second traffic type. The first traffic type may include ultra-reliable communication types, low-latency communication types, or other communication types that may rely on low error rates or small delays. The second communication type may include communication types such as eMBB or other communication types that do not correspond to low-latency or ultra-reliable communications. In some cases, UE 115-*a* may determine whether to transmit enhanced feedback based on the determined traffic type. In some cases, UE 115-*a* may determine how to transmit feedback (e.g., what to send in the feedback, whether to send enhanced feedback, how often to send feedback, etc.) based on the determined type of traffic. Additionally, or alternatively, the different types of feedback for the different types of traffic may vary. For example, the enhanced feedback may include a first type of feedback information for high priority communications (e.g., ultra-reliable communications, URLCC), and a second type of feedback information for low priority communications (e.g., eMBB, mMTC). In some cases, UE 115-*a* may transmit the enhanced feedback according to a first periodicity of transmission (e.g., relatively high periodicity) for high priority communications (e.g., URLCC), and transmit the enhanced feedback according to a second periodicity of transmission (e.g., relatively low periodicity) for low priority communications (e.g., eMBB, mMTC). In some cases, UE 115-*a* may send feedback more often for the first traffic type than the second traffic type (e.g., report feedback every 10 ms for the first traffic type and every 100 ms for the second traffic type).

UE 115-*a* may determine that downlink message 205 is of the first traffic type. In these cases, UE 115-*a* may determine to provide enhanced feedback 210 in addition to acknowledgment message 215. The enhanced feedback may include an expected error rate associated with the downlink message 205, or channel quality information associated with downlink message 205, or another type of additional feedback information.

UE 115-*a* may transmit enhanced feedback 210 in a layer 1 transmission (e.g., the physical layer, including a physical uplink control channel (PUCCH) or a physical uplink shared channel (PUSCH)) or layer 2 transmission (e.g., MAC layer). UE 115-*a* may transmit the enhanced feedback 210 in a layer 1 transmission in cases where acknowledgment message 215 is a NACK. UE 115-*a* may transmit the enhanced feedback 210 in a layer 2 transmission in cases where acknowledgment message 215 is a positive ACK. In some cases, the enhanced feedback 210 may indicate a request for a lower error rate or a lower latency, or both, than the operation state in which downlink message 205 is transmitted.

UE 115-*a* may transmit enhanced feedback 210 periodically, or after each transmission. For example, UE 115-*a* may identify periodic scheduled or granted uplink occasions in which to transmit the enhanced feedback. UE 115-*a* may send the enhanced feedback 210 in an uplink occasion after a downlink occasion in which a downlink message 205 is received by UE 115-*a*.

In some cases, UE 115-*a* may determine to transmit the enhanced feedback 210 according to a trigger. The trigger may be that an estimated error rate of downlink message 205 is higher than a threshold or target error rate. If the estimated error rate surpasses the threshold, UE 115-*a* may determine to transmit enhanced feedback 210 for that downlink message 205. In some cases, UE 115-*a* may receive, from base station 105-*a*, a request to transmit the enhanced feedback 210.

In some cases, base station 105-*a* may transmit, in a layer 1 transmission, an indication of a QoS (e.g., a traffic type) of the downlink message 205. This layer 1 transmission may be a downlink control information (DCI) message. The QoS level may be in the form of a priority value, which may depend on a multiplexed data radio bearer (DRB) payload, in the scheduled downlink message 205. UE 115-*a* may determine the traffic type of downlink message 205 based on the received indication.

Additionally, or alternatively, UE 115-*a* may determine the QoS and corresponding traffic type of downlink message 205 based on a set of logical channels multiplexed in the MAC transport block on which UE 115-*a* received the downlink message 205. For example, UE 115-*a* may determine the traffic type based on the traffic type that corresponds to the logical channel with the highest channel quality index (CQI) (e.g., 5G CQI) that is multiplexed in the corresponding DRB.

UE 115-*a* may transmit enhanced feedback 210 and acknowledgment message 215. The enhanced feedback 210 may be based on the downlink message 205 having a QoS level corresponding to the first traffic type. In some cases, UE 115-*a* may receive multiple downlink messages 205 in a time period. UE 115-*a* may determine to send enhanced feedback 210 for (e.g., only for) the downlink messages 205 corresponding to the first traffic type (e.g., the highest QoS level) of the set of downlink messages 205 received in the time period. In other cases, UE 115-*a* may send enhanced feedback 210 for multiple different QoS levels of the downlink messages 205. For example, UE 115-*a* may transmit enhanced feedback 210 including a first value for downlink messages 205 of a first QoS level, and UE 115-*a* may transmit enhanced feedback 210 including a second value for downlink message 205 of a second QoS level (e.g., lower than the first QoS level).

Further, UE 115-*a* may determine enhanced feedback 210 and the associated QoS level by the physical resources on which the enhanced feedback is sent. For example, UE 115-*a* may receive downlink message 205, and UE 115-*a* may identify resources on which to transmit feedback for downlink message 205. UE 115-*a* may identify the enhanced feedback 210 corresponding to the downlink message 205, or identify the QoS level of the downlink message 205, based on the resources on which UE 115-*a* will transmit the enhanced feedback 210, rather than the resources on which UE 115-*a* received the downlink message 205. The enhanced feedback 210 may include a specific reference of the QoS level. This specific reference may be based on the priority level of the downlink message 205 (e.g., as received in a DCI), or may include a logical channel identifier, a QoS flow identifier, or a CQI identifier (e.g., a 5G CQI identifier) as an indicator of the QoS level in the MAC control element (MAC-CE) enhanced feedback 210 transmission.

In other cases, UE 115-*a* may determine that downlink message 205 is of a second traffic type, different from the first traffic type. In these cases, UE 115-*a* may determine not to transmit enhanced feedback 210, or may determine to transmit a different type of enhanced feedback.

Figure 3:
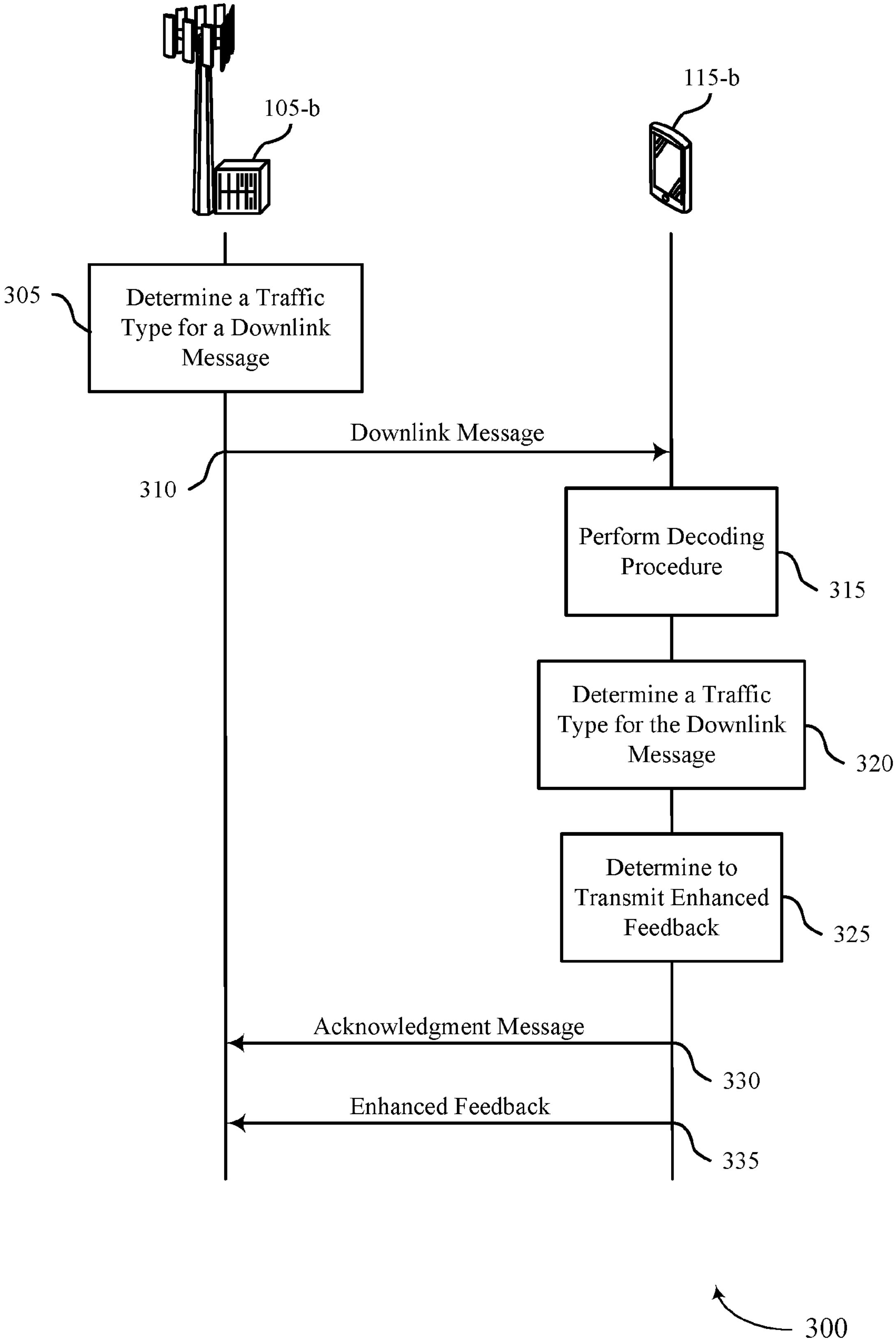
FIG. 3 illustrates an example of a process flow that supports enhanced decoding feedback for traffic type differentiation in accordance with aspects of the present disclosure.

FIG. 3 illustrates an example of a process flow 300 that supports enhanced decoding feedback for traffic type differentiation in accordance with aspects of the present disclosure. In some examples, process flow 300 may implement aspects of wireless communication systems 100 and 200. Process flow 300 includes UE 115-*b*, which may be an example of a UE 115 as described with respect to FIGS. 1 and 2. Process flow 300 also includes base station 105-*b*, which may be an example of a base station 105 as described with respect to FIGS. 1 and 2. UE 115-*b* and base station 105-*b* may communicate as part of a wireless communications system.

At 305, base station 105-*b* may determine a traffic type for a downlink message to be transmitted to a UE 115-*b*. The traffic type may be a first traffic type or a second traffic type. The first traffic type may be associated with a lower error rate or a lower latency, or both, than the second traffic type. For example, the first traffic type may be a URLLC type.

At 310, base station 105-*b* may transmit the downlink message to UE 115-*b*. UE 115-*b* may receive the downlink message from base station 105-*b*.

At 315, UE 115-*b* may perform a decoding procedure for the received downlink message. At 320, UE 115-*b* may determine the traffic type for the downlink message, where the traffic type is a first traffic type or a second traffic type. The first traffic type may be associated with a lower error rate or a lower latency, or both, than the second traffic type. The first traffic type may be different from the second traffic type, and the second traffic type may be associated with a type of enhanced feedback that is different from the enhanced feedback associated with the acknowledgment message.

In some cases, UE 115-*b* may receive a DCI message from base station 105-*b*. In these cases, UE 115-*b* may determine the first traffic type based on a QoS level indicated by the DCI message. The enhanced feedback transmitted at 335 may include an indication of the QoS indicated by the DCI message. Further, UE 115-*b* may determine, for each logical channel of a set of logical channels multiplexed in the downlink message, a QoS level for the logical channel. UE 115-*b* may determine the first traffic type based on a highest QoS level among the determines QoS levels.

At 325, UE 115-*b* may determine, based on the received downlink message being of the first traffic type, to transmit enhanced feedback with an acknowledgment message indicating a result of the performed decoding procedure for the received downlink message. The enhanced feedback may indicate assistance information associated with a quality of service level, for example channel quality information or an expected error rate, for the received downlink message.

In some cases, UE 115-*b* may determine that a trigger condition is satisfied, and UE 115-*b* may transmit the enhanced feedback based on determining that the trigger condition is satisfied. In some cases, UE 115-*b* may determine that an error rate threshold for the first traffic type is satisfied, where the trigger condition includes the determining that the error rate threshold is satisfied. In some case, UE 115-*b* may transmit the enhanced feedback based on determining that the error rate threshold is satisfied, and the error rate threshold may indicate a downlink message with a lowest error rate.

At 330, UE 115-*b* may transmit the acknowledgment message. At 335, UE 115-*b* may transmit the enhanced feedback for the acknowledgment message. The enhanced feedback may include an indication of the first traffic type. The indication may include a logical channel identifier, a QoS flow identifier (e.g., a 5G QoS identifier), or a combination of these. UE 115-*b* may transmit the enhanced feedback for the acknowledgment message together with the acknowledgment message. Based on the results of the decoding procedure, UE 115-*b* may determine whether to transmit the enhanced feedback in a first layer transmission or a second layer transmission. In some cases, UE 115-*b* may transmit the enhanced feedback in the first layer based on the acknowledgment message being a NACK message. In other cases, UE 115-*b* may transmit the enhanced feedback in the second layer based on the acknowledgment message being a positive ACK message. The first layer may be a physical layer and the second layer may be a MAC layer.

In some cases, UE 115-*b* may transmit periodically, for downlink messages of the first traffic type, enhanced feedback indicating assistance information associated with the quality of service level. UE 115-*a* may transmit, for each downlink message received from base station 105-*b*, an enhanced feedback associated with the downlink message.

UE 115-*b* may identify a first set of resources for enhanced feedbacks of the first traffic type, and a second set of resources for feedback messages of a second traffic type. UE 115-*b* may then transmit the enhanced feedback on the first set of resources.

Figure 4:
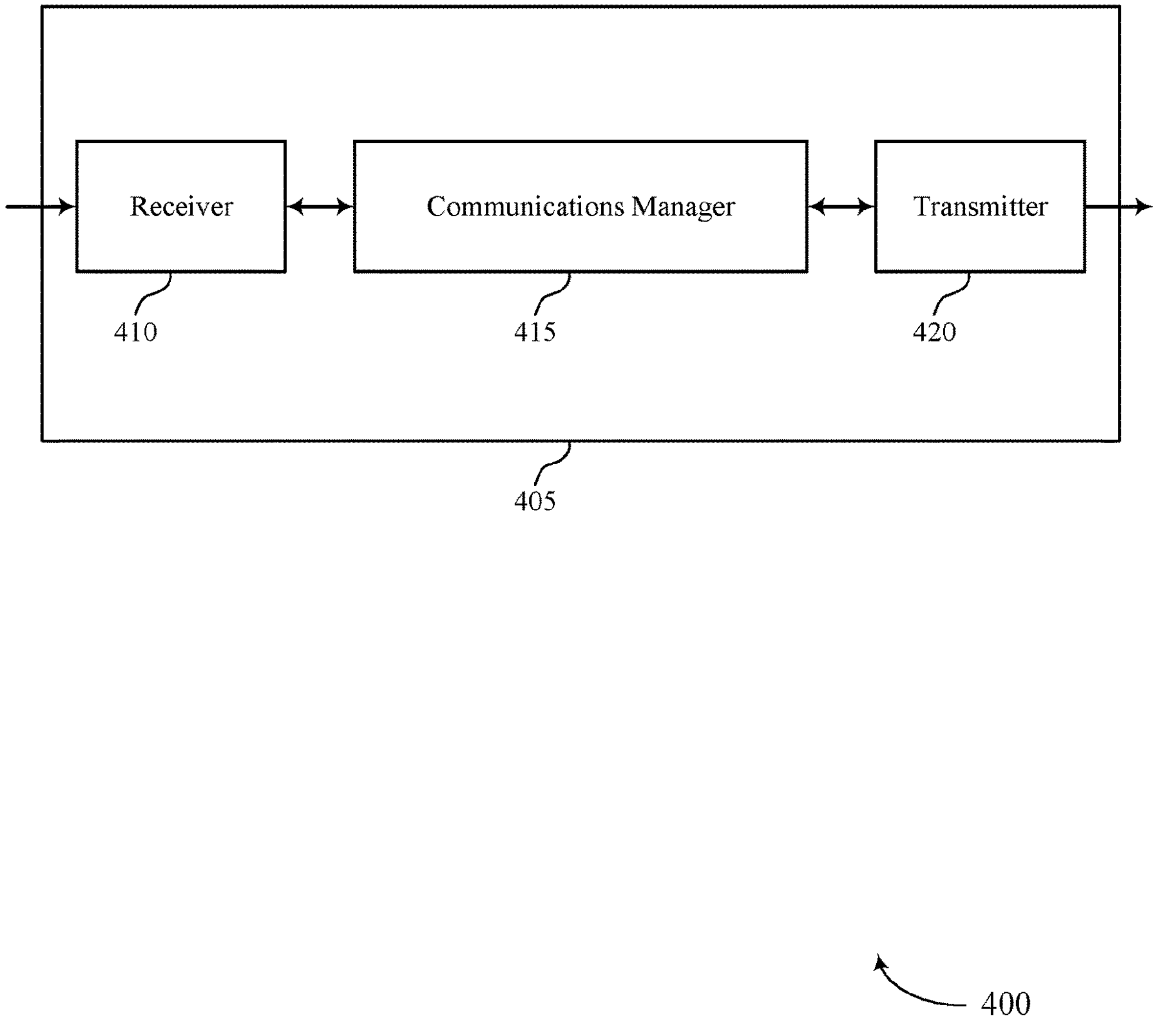
FIGS. 4 and 5 show block diagrams of devices that support enhanced decoding feedback for traffic type differentiation in accordance with aspects of the present disclosure.

FIG. 4 shows a block diagram 400 of a device 405 that supports enhanced decoding feedback for traffic type differentiation in accordance with aspects of the present disclosure. The device 405 may be an example of aspects of a UE 115 as described herein. The device 405 may include a receiver 410, a communications manager 415, and a transmitter 420. The device 405 may include a processor. Each of these components may be in communication with one another (e.g., via one or more buses).

The receiver 410 may receive information such as packets, user data, or control information associated with various information channels (e.g., control channels, data channels, and information related to enhanced decoding feedback for traffic type differentiation, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a downlink message from a base station, perform a decoding procedure for the received downlink message, determine the downlink message has a traffic type associated with a quality of service level, determine, based on the traffic type, to transmit enhanced feedback with an acknowledgment message indicating a result of the performed decoding procedure for the received downlink message, the enhanced feedback indicating assistance information associated with the quality of service level for the received downlink message, and transmit the acknowledgment message and the enhanced feedback for the acknowledgment message.

The communications manager 415 may receive a downlink message from a base station, perform a decoding procedure for the received downlink message, determine a traffic type for the downlink message, the traffic type being a first traffic type or a second traffic type, the first traffic type associated with a lower error rate or a lower latency, or both, than the second traffic type, determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with a quality of service level for the received downlink message, and transmit the acknowledgment message and the enhanced feedback for the acknowledgment message together with the acknowledgment message. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
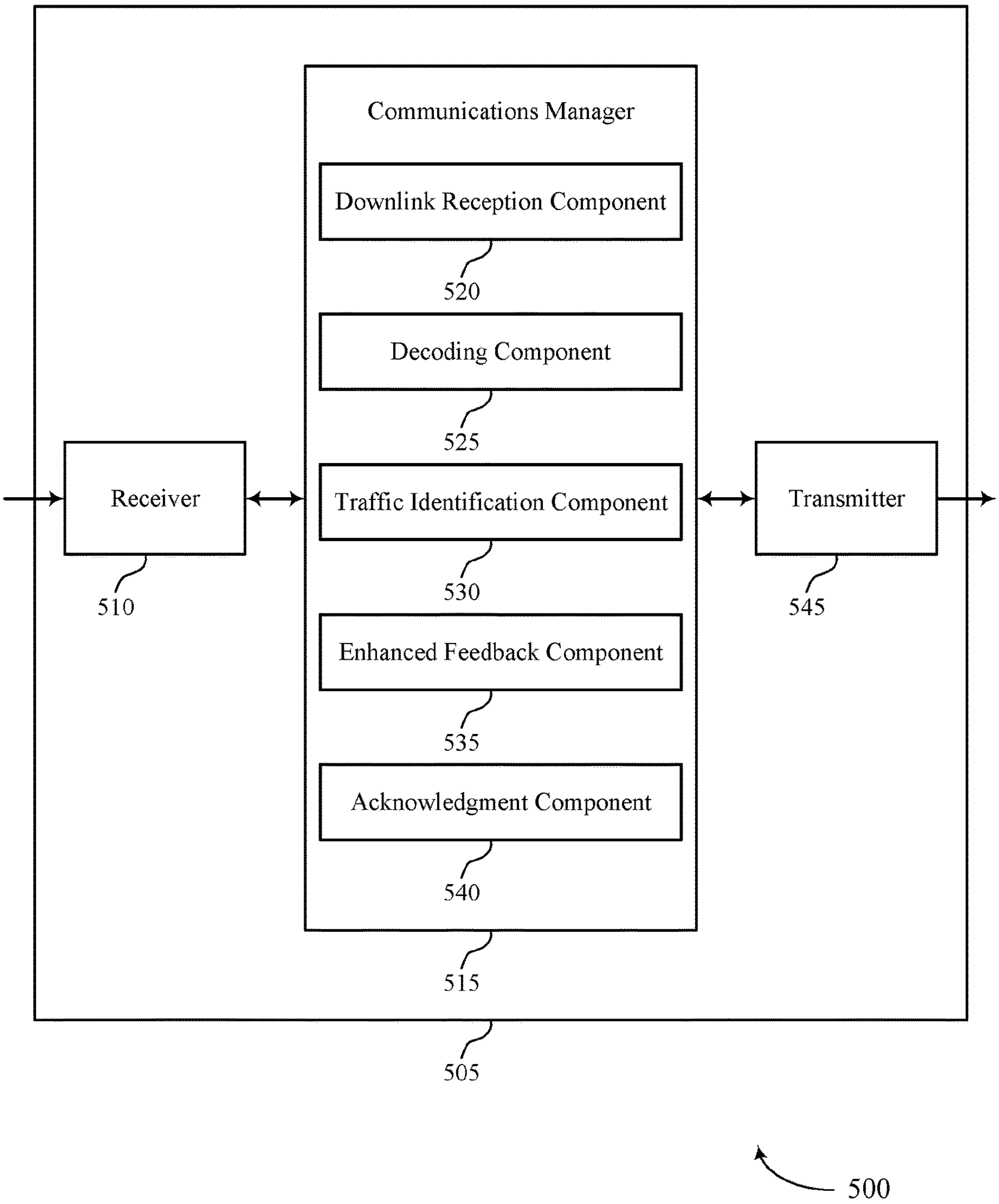

FIG. 5 shows a block diagram 500 of a device 505 that supports enhanced decoding feedback for traffic type differentiation in accordance with aspects of the present disclosure. The device 505 may be an example of aspects of a device 405, or a UE 115 as described herein. The device 505 may include a receiver 510, a communications manager 515, and a transmitter 545. The device 505 may include a processor. Each of these components may be in communication with one another (e.g., via one or more buses).

The receiver 510 may receive information such as packets, user data, or control information associated with various information channels (e.g., control channels, data channels, and information related to enhanced decoding feedback for traffic type differentiation, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a downlink reception component 520, a decoding component 525, a traffic identification component 530, an enhanced feedback component 535, and an acknowledgment component 540. The communications manager 515 may be an example of aspects of the communications manager 710 described herein.

The downlink reception component 520 may receive a downlink message from a base station. The decoding component 525 may perform a decoding procedure for the received downlink message. The traffic identification component 530 may determine the downlink message has a traffic type associated with a quality of service level. The enhanced feedback component 535 may determine, based on the traffic type, to transmit enhanced feedback with an acknowledgment message indicating a result of the performed decoding procedure for the received downlink message, the enhanced feedback indicating assistance information associated with the quality of service level for the received downlink message. The acknowledgment component 540 may transmit the acknowledgment message and the enhanced feedback for the acknowledgment message.

The traffic identification component 530 may determine a traffic type for the downlink message, the traffic type being a first traffic type or a second traffic type, the first traffic type associated with a lower error rate or a lower latency, or both, than the second traffic type. The enhanced feedback component 535 may determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with a quality of service level for the received downlink message.

The acknowledgment component 540 may transmit the acknowledgment message and the enhanced feedback for the acknowledgment message together with the acknowledgment message.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
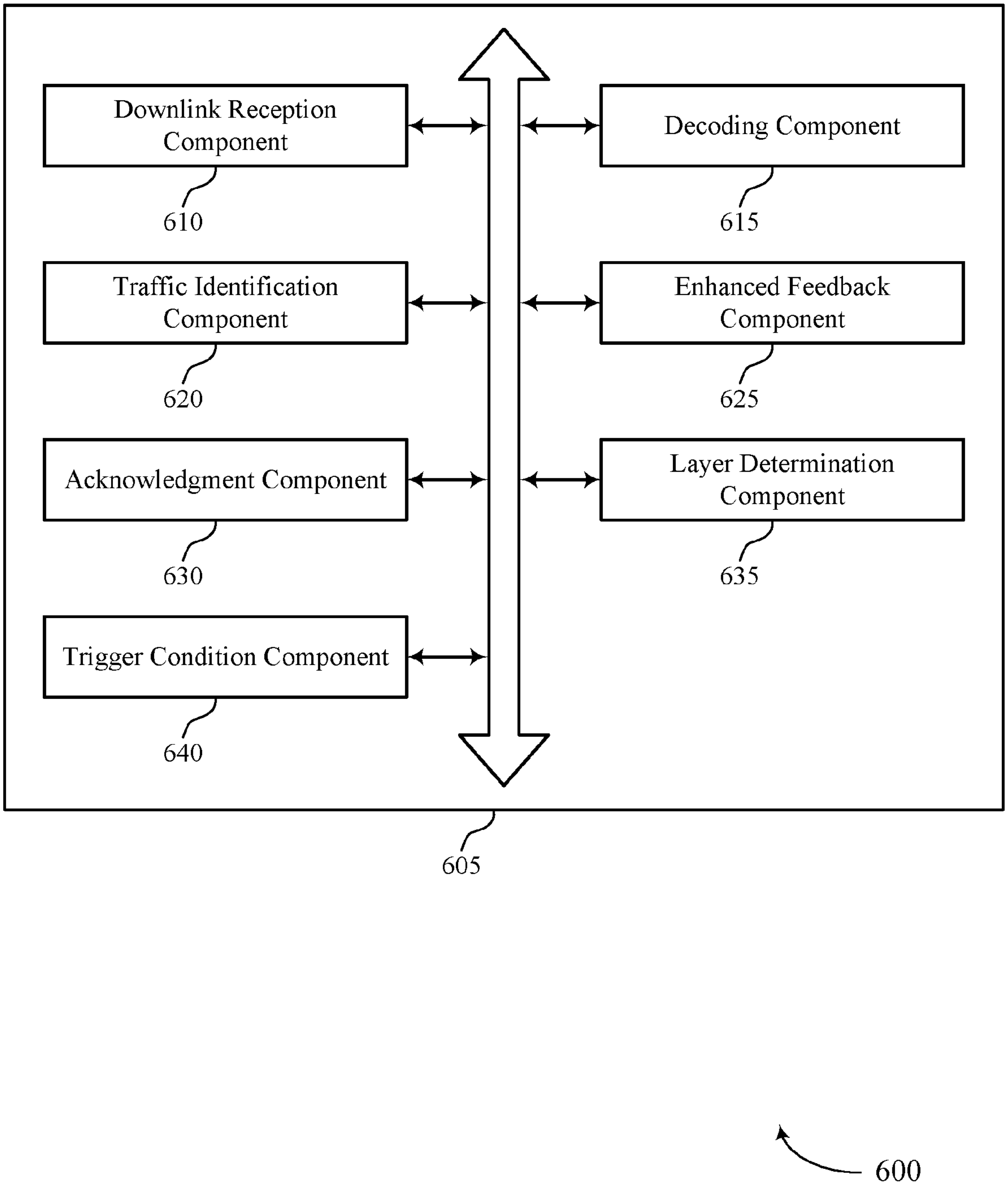
FIG. 6 shows a block diagram of a communications manager that supports enhanced decoding feedback for traffic type differentiation in accordance with aspects of the present disclosure.

FIG. 6 shows a block diagram 600 of a communications manager 605 that supports enhanced decoding feedback for traffic type differentiation in accordance with aspects of the present disclosure. The communications manager 605 may be an example of aspects of a communications manager 415, a communications manager 515, or a communications manager 710 described herein. The communications manager 605 may include a downlink reception component 610, a decoding component 615, a traffic identification component 620, an enhanced feedback component 625, an acknowledgment component 630, a layer determination component 635, and a trigger condition component 640. Each of these modules may communicate, directly or indirectly, with one another (e.g., via one or more buses).

The downlink reception component 610 may receive a downlink message from a base station. In some examples, the downlink reception component 610 may receive a DCI message from the base station. The decoding component 615 may perform a decoding procedure for the received downlink message.

The traffic identification component 620 may determine the downlink message has a traffic type associated with a quality of service level. The enhanced feedback component 625 may determine, based on the traffic type to transmit enhanced feedback with an acknowledgment message indicating a result of the performed decoding procedure for the received downlink message, the enhanced feedback indicating assistance information associated with the quality of service level for the received downlink message. The acknowledgment component 630 may transmit the acknowledgment message and the enhanced feedback for the acknowledgment message.

The traffic identification component 620 may determine a traffic type for the downlink message, the traffic type being a first traffic type or a second traffic type, the first traffic type associated with a lower error rate or a lower latency, or both, than the second traffic type. In some examples, the traffic identification component 620 may determine the first traffic type based on a QoS level indicated by the DCI. In some examples, the traffic identification component 620 may determine, for each logical channel of a set of logical channels multiplexed in the downlink message, a QoS level for the logical channel. In some examples, the traffic identification component 620 may determine the first traffic type based on a highest QoS level among the determined QoS levels.

In some examples, the traffic identification component 620 may identify a first set of resources for enhanced feedbacks of the first traffic type, and a second set of resources for feedback messages of a second traffic type. In some cases, the first traffic type is different from a second traffic type, the second traffic type associated with a type of enhanced feedback that is different from the enhanced feedback associated with the acknowledgment message.

The enhanced feedback component 625 may determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with the quality of service level for the received downlink message.

In some examples, the enhanced feedback component 625 may transmit periodically, for downlink messages of the first traffic type, enhanced feedback indicating assistance information associated with the quality of service level. In some examples, the assistance information is channel quality information, or an estimated error rate, or both. In some examples, the enhanced feedback component 625 may transmit, for each downlink message received from the base station, an enhanced feedback associated with the downlink message. In some examples, the enhanced feedback component 625 may receive an indication of a periodic configuration for transmitting enhanced feedback. The enhanced feedback associated with the downlink message may be transmitted according to the periodic configuration. In some examples, the enhanced feedback component 625 may receive an indication to activate the periodic configuration. The enhanced feedback associated with the downlink message may be transmitted according to the periodic configuration based at least in part on the received indication to activate the periodic configuration. In some examples, receiving the indication to activate the periodic configuration may include receiving a downlink control information message or a medium access control control element that includes the indication to activate the periodic configuration. In some examples, the enhanced feedback component 625 may receive, from the base station, a request for the UE to transmit enhanced feedback. In some examples, the enhanced feedback component 625 may transmit the enhanced feedback on the first set of resources. In some cases, the enhanced feedback includes an indication of the QoS level indicated by the DCI message, or the enhanced feedback includes an indication of the first traffic type, or both. In some cases, the indication includes a logical channel identifier, a QoS flow identifier, a 5G QoS identifier, or a combination thereof.

The acknowledgment component 630 may transmit the acknowledgment message and the enhanced feedback for the acknowledgment message together with the acknowledgment message.

The layer determination component 635 may determine, based on the result of the performed decoding procedure, whether to transmit the enhanced feedback in a first layer transmission or a second layer transmission. In some examples, the layer determination component 635 may transmit the enhanced feedback in the first layer based on the acknowledgment message being a negative acknowledgment message. In some examples, the layer determination component 635 may transmit the enhanced feedback in the second layer based on the acknowledgment message being a positive acknowledgment message. In some examples, the layer determination component 635 may transmit the indication in a MAC layer. In some cases, the first layer is a physical layer and the second layer is a MAC layer.

The trigger condition component 640 may determine that a trigger condition is satisfied. In some examples, the trigger condition component 640 may transmit the enhanced feedback based on determining that the trigger condition is satisfied. In some examples, determining that an error rate threshold for the first traffic type is satisfied, where the trigger condition includes the determining that the error rate threshold is satisfied. In some examples, the trigger condition component 640 may transmit the enhanced feedback based on determining that the error rate threshold is satisfied, where the error rate threshold indicates a downlink message with a lowest error rate. In some examples, the trigger condition component 640 may determine that the trigger condition is satisfied based on the received request.

Figure 7:
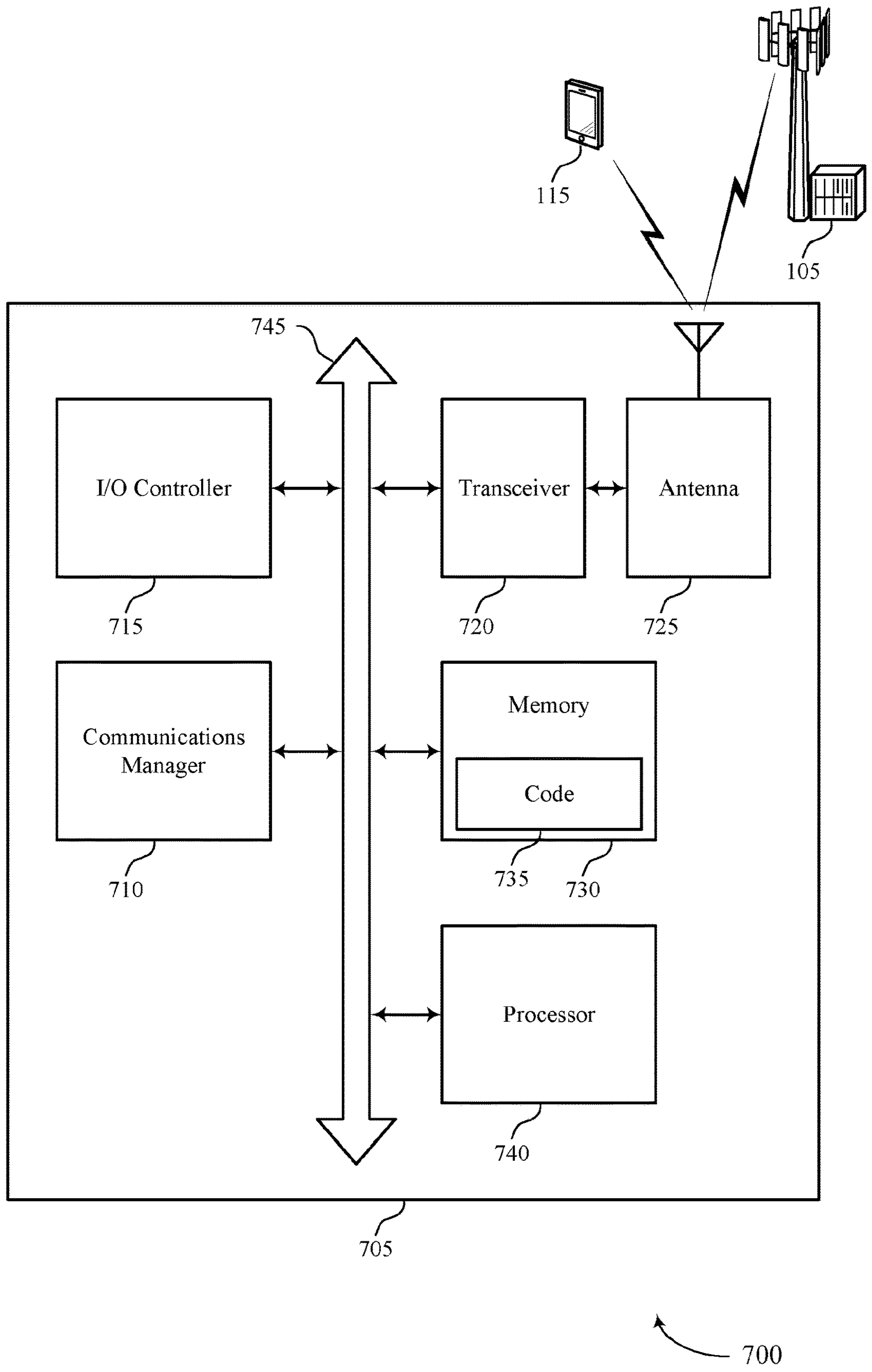
FIG. 7 shows a diagram of a system including a device that supports enhanced decoding feedback for traffic type differentiation in accordance with aspects of the present disclosure.

FIG. 7 shows a diagram of a system 700 including a device 705 that supports enhanced decoding feedback for traffic type differentiation in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a downlink message from a base station, perform a decoding procedure for the received downlink message, determine the downlink message has a traffic type associated with a quality of service level, determine, based on the traffic type, to transmit enhanced feedback with an acknowledgment message indicating a result of the performed decoding procedure for the received downlink message, the enhanced feedback indicating assistance information associated with the quality of service level for the received downlink message, and transmit the acknowledgment message and the enhanced feedback for the acknowledgment message.

The communications manager 710 may receive a downlink message from a base station, perform a decoding procedure for the received downlink message, determine a traffic type for the downlink message, the traffic type being a first traffic type or a second traffic type, the first traffic type associated with a lower error rate or a lower latency, or both, than the second traffic type, determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with a quality of service level for the received downlink message, and transmit the acknowledgment message and the enhanced feedback for the acknowledgment message together with the acknowledgment message.

The I/O controller 715 may manage input and output signals for the device 705. The I/O controller 715 may manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting enhanced decoding feedback for traffic type differentiation).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
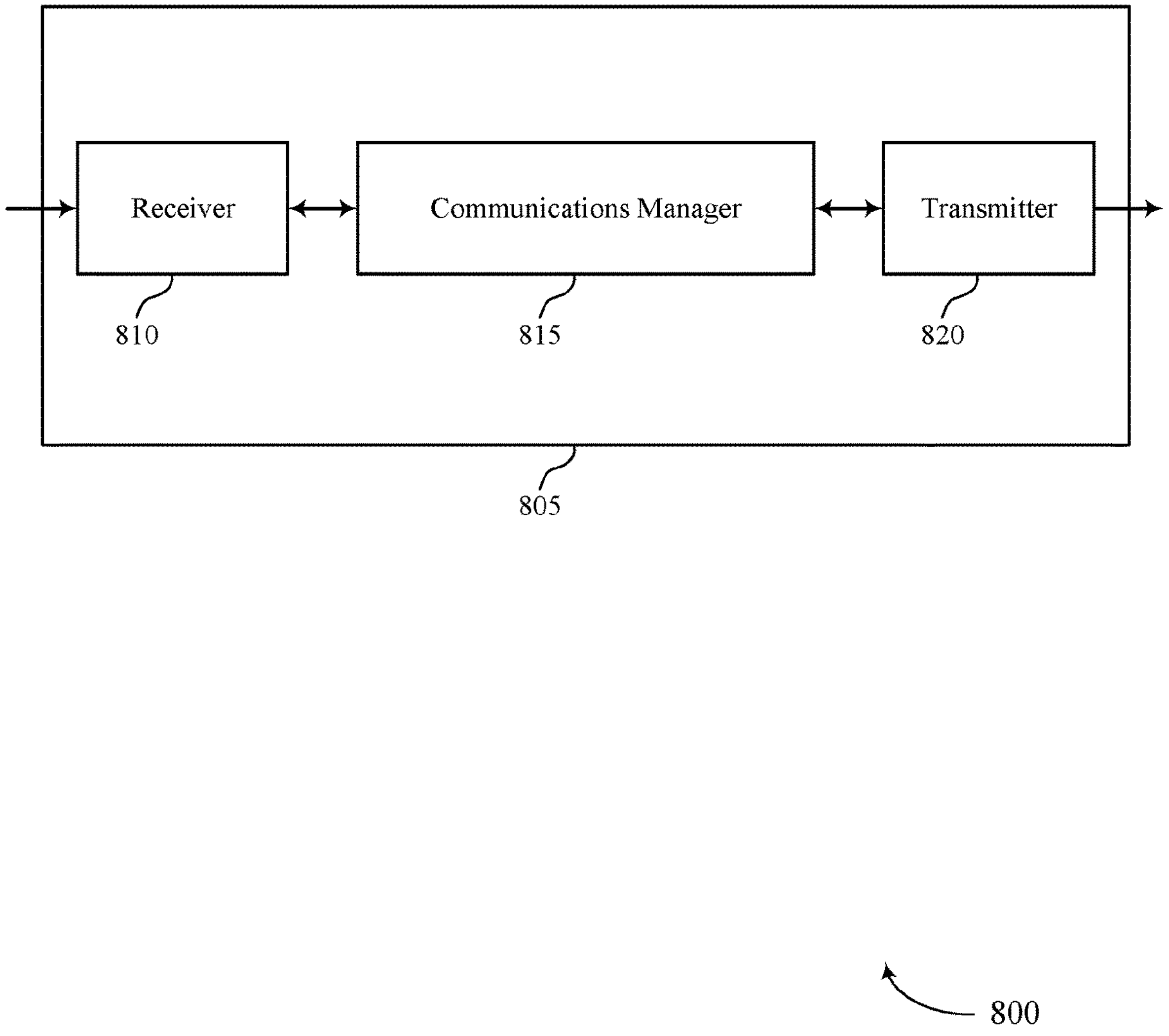
FIGS. 8 and 9 show block diagrams of devices that support enhanced decoding feedback for traffic type differentiation in accordance with aspects of the present disclosure.

FIG. 8 shows a block diagram 800 of a device 805 that supports enhanced decoding feedback for traffic type differentiation in accordance with aspects of the present disclosure. The device 805 may be an example of aspects of a base station 105 as described herein. The device 805 may include a receiver 810, a communications manager 815, and a transmitter 820. The device 805 may include a processor. Each of these components may be in communication with one another (e.g., via one or more buses).

The receiver 810 may receive information such as packets, user data, or control information associated with various information channels (e.g., control channels, data channels, and information related to enhanced decoding feedback for traffic type differentiation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a user equipment (UE), a downlink message associated with a quality of service level, and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

The communications manager 815 may determine a traffic type for a downlink message to be transmitted to a UE, the traffic type being a first traffic type or a second traffic type, the first traffic type associated with a lower error rate or a lower latency, or both, than the second traffic type, transmit the downlink message to the UE, and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with a quality of service level for the transmitted downlink message. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
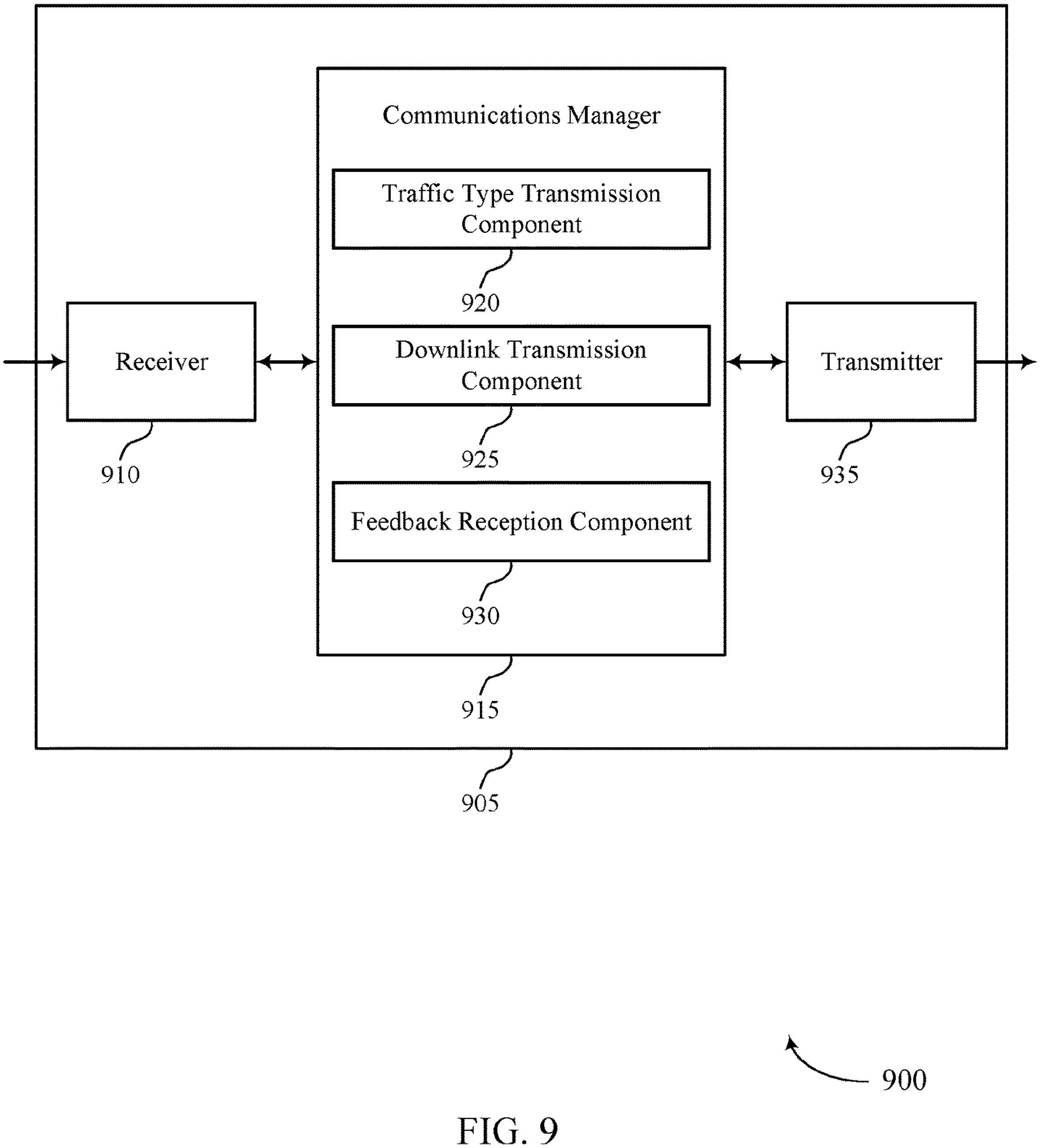

FIG. 9 shows a block diagram 900 of a device 905 that supports enhanced decoding feedback for traffic type differentiation in accordance with aspects of the present disclosure. The device 905 may be an example of aspects of a device 805, or a base station 105 as described herein. The device 905 may include a receiver 910, a communications manager 915, and a transmitter 935. The device 905 may include a processor. Each of these components may be in communication with one another (e.g., via one or more buses).

The receiver 910 may receive information such as packets, user data, or control information associated with various information channels (e.g., control channels, data channels, and information related to enhanced decoding feedback for traffic type differentiation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a traffic type transmission component 920, a downlink transmission component 925, and a feedback reception component 930. The communications manager 915 may be an example of aspects of the communications manager 1110 described herein.

The downlink transmission component 925 may transmit, to a user equipment (UE), a downlink message associated with a quality of service level. The feedback reception component 930 may receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

The traffic type transmission component 920 may determine a traffic type for a downlink message to be transmitted to a UE, the traffic type being a first traffic type or a second traffic type, the first traffic type associated with a lower error rate or a lower latency, or both, than the second traffic type. The downlink transmission component 925 may transmit the downlink message to the UE.

The feedback reception component 930 may receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with a quality of service level for the transmitted downlink message.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
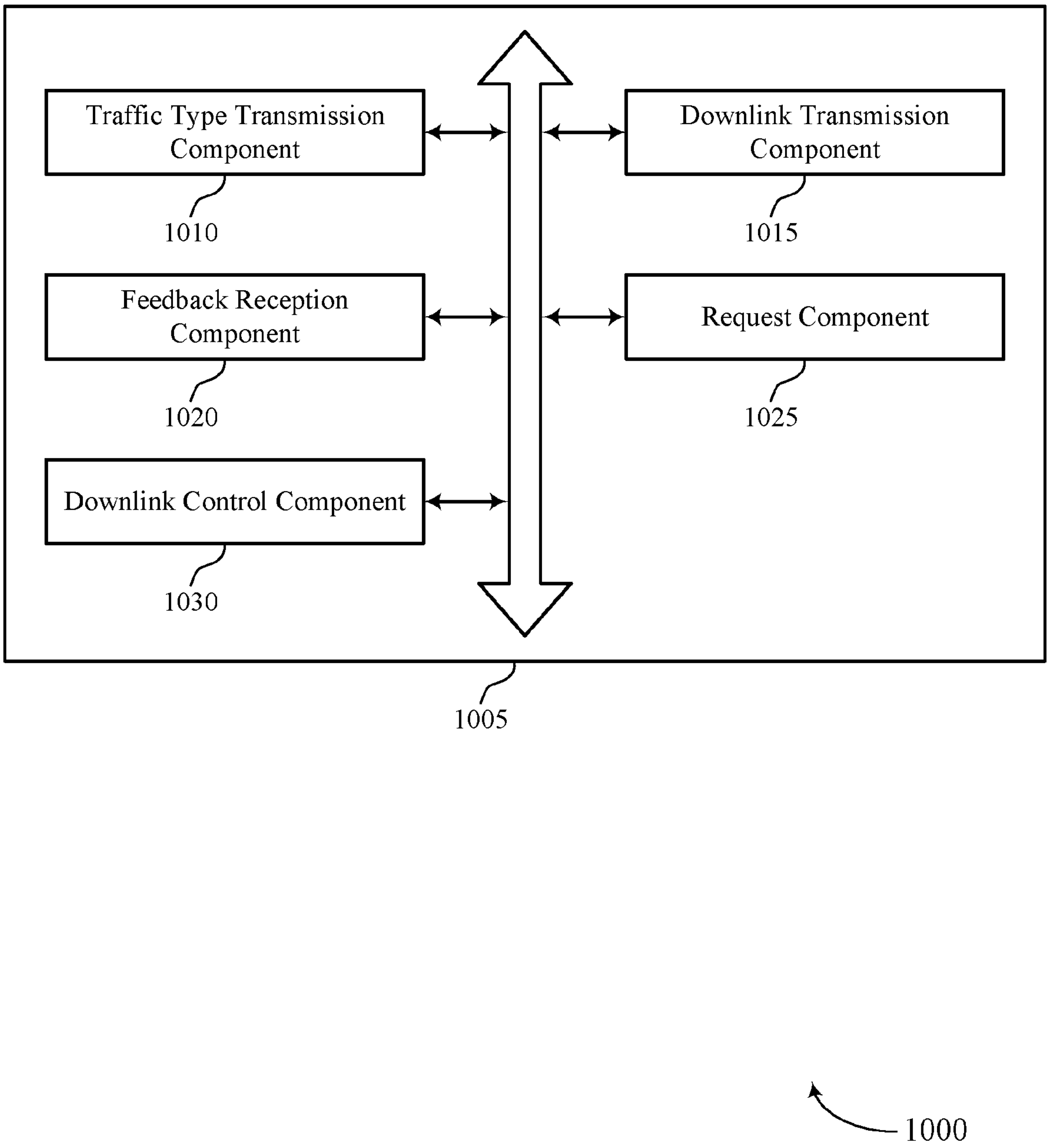
FIG. 10 shows a block diagram of a communications manager that supports enhanced decoding feedback for traffic type differentiation in accordance with aspects of the present disclosure.

FIG. 10 shows a block diagram 1000 of a communications manager 1005 that supports enhanced decoding feedback for traffic type differentiation in accordance with aspects of the present disclosure. The communications manager 1005 may be an example of aspects of a communications manager 815, a communications manager 915, or a communications manager 1110 described herein. The communications manager 1005 may include a traffic type transmission component 1010, a downlink transmission component 1015, a feedback reception component 1020, a request component 1025, and a downlink control component 1030. Each of these modules may communicate, directly or indirectly, with one another (e.g., via one or more buses).

The downlink transmission component 1015 may transmit, to a user equipment (UE), a downlink message associated with a quality of service level. The feedback reception component 1020 may receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

The traffic type transmission component 1010 may determine a traffic type for a downlink message to be transmitted to a UE, the traffic type being a first traffic type or a second traffic type, the first traffic type associated with a lower error rate or a lower latency, or both, than the second traffic type. In some cases, the first traffic type is different from a second traffic type, the second traffic type associated with a second type of enhanced feedback that is different from the enhanced feedback. The downlink transmission component 1015 may transmit the downlink message to the UE.

The feedback reception component 1020 may receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with a quality of service level for the transmitted downlink message. In some examples, the assistance information is channel quality information, or an estimated error rate, or both.

In some examples, the feedback reception component 1020 may receive the enhanced feedback in a first layer transmission or a second layer transmission. In some examples, the feedback reception component 1020 may receive the enhanced feedback in the first layer, where the acknowledgment message is a negative acknowledgment message. In some examples, the feedback reception component 1020 may receive the enhanced feedback in the second layer, where the acknowledgment message is a positive acknowledgment message. In some examples, the feedback reception component 1020 may receive periodically, for downlink messages of the first traffic type, enhanced feedbacks indicating assistance information associated with a quality of service level. In some examples, the feedback reception component 1020 may receive, for each downlink message transmitted by the base station, enhanced feedback associated with the downlink message. In some examples, the feedback reception component 1020 may receive the enhanced feedback based on a satisfaction of a trigger condition.

In some examples, the feedback reception component 1020 may receive the enhanced feedback on a first set of resources, where the first set of resources correspond to the first traffic type, where the first set of resources are different from a second set of resources for enhanced feedbacks of a second traffic type. In some examples, the feedback reception component 1020 may receive the indication in a MAC layer.

In some cases, the first layer is a physical layer and the second layer is a MAC layer. In some cases, the trigger condition is an error rate threshold. In some cases, the error rate threshold indicates the downlink message with a lowest error rate. In some cases, the enhanced feedback includes an indication of the first traffic type. In some cases, the indication includes a logical channel identifier, a QoS flow identifier, a 5G QoS identifier, or a combination thereof.

The request component 1025 may transmit to the UE, a request for the UE to transmit enhanced feedback, where the trigger condition includes the request. In some examples, the request component 1025 may transmit an indication of a periodic configuration for transmitting enhanced feedback. The enhanced feedback associated with the downlink message may be received according to the periodic configuration. In some examples, the request component 1025 may transmit an indication to activate the periodic configuration. The enhanced feedback associated with the downlink message may be received according to the periodic configuration based at least in part on the received indication to activate the periodic configuration. In some examples, transmitting the indication to activate the periodic configuration may include transmitting a downlink control information message or a medium access control control element that includes the indication to activate the periodic configuration.

The downlink control component 1030 may transmit a DCI message to the UE, where a QoS level of the first traffic type is indicated by the DCI. In some cases, the enhanced feedback includes an indication of the QoS level indicated by the DCI message.

Figure 11:
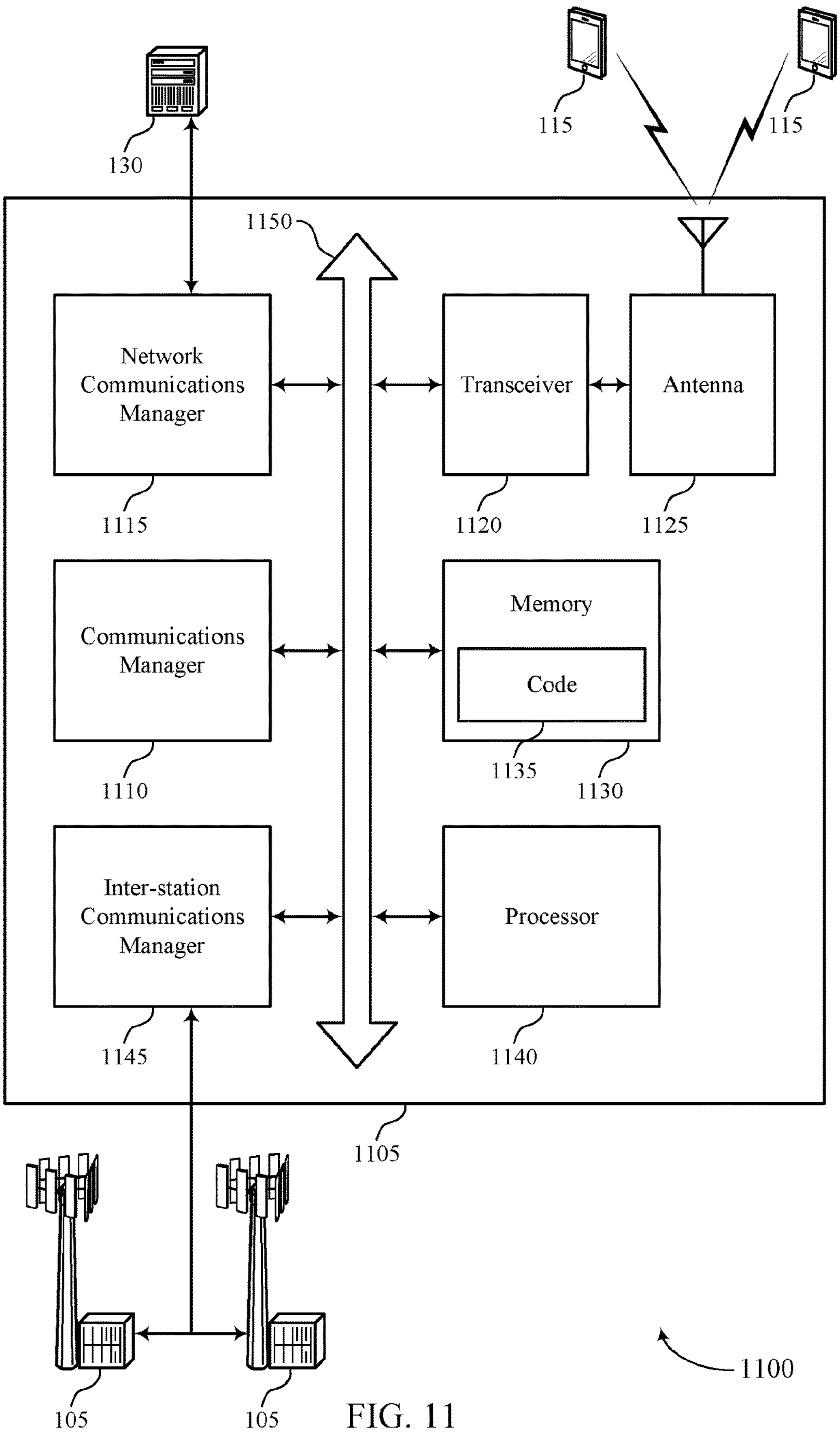
FIG. 11 shows a diagram of a system including a device that supports enhanced decoding feedback for traffic type differentiation in accordance with aspects of the present disclosure.

FIG. 11 shows a diagram of a system 1100 including a device 1105 that supports enhanced decoding feedback for traffic type differentiation in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a user equipment (UE), a downlink message associated with a quality of service level, and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

The communications manager 1110 may determine a traffic type for a downlink message to be transmitted to a UE, the traffic type being a first traffic type or a second traffic type, the first traffic type associated with a lower error rate or a lower latency, or both, than the second traffic type, transmit the downlink message to the UE, and receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with a quality of service level for the transmitted downlink message.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting enhanced decoding feedback for traffic type differentiation).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
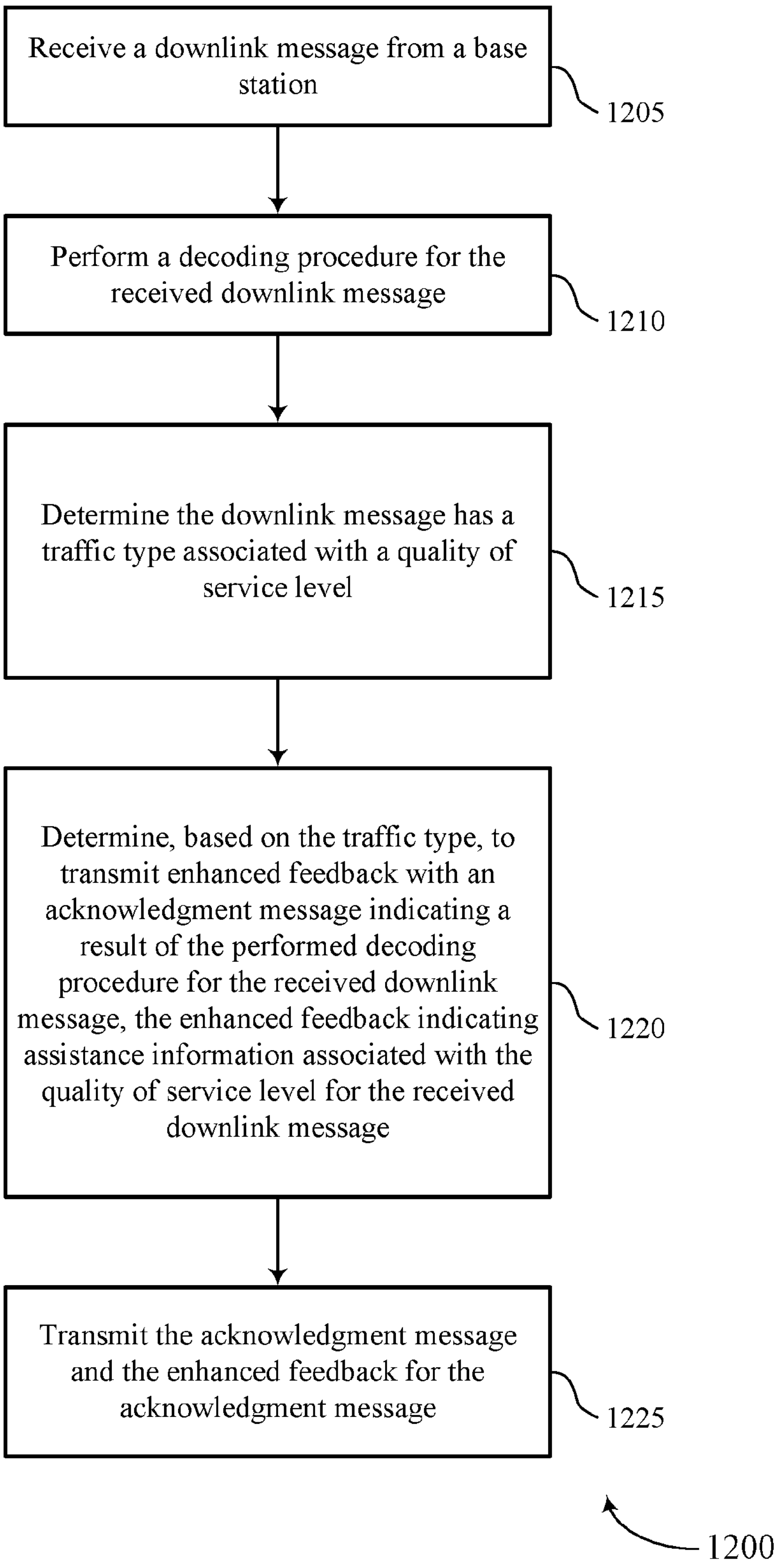
FIGS. 12 through 15 show flowcharts illustrating methods that support enhanced decoding feedback for traffic type differentiation in accordance with aspects of the present disclosure.

FIG. 12 shows a flowchart illustrating a method 1200 that supports enhanced decoding feedback for traffic type differentiation in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1205, the UE may receive a downlink message from a base station. The operations of 1205 may be performed according to the methods described herein. In some examples, aspects of the operations of 1205 may be performed by a downlink reception component as described with reference to FIGS. 4 through 7.

At 1210, the UE may perform a decoding procedure for the received downlink message. The operations of 1210 may be performed according to the methods described herein. In some examples, aspects of the operations of 1210 may be performed by a decoding component as described with reference to FIGS. 4 through 7.

At 1215, the UE may determine the downlink message has a traffic type associated with a quality of service level. The operations of 1215 may be performed according to the methods described herein. In some examples, aspects of the operations of 1215 may be performed by a traffic identification component as described with reference to FIGS. 4 through 7.

At 1220, the UE may determine, based on the traffic type, to transmit enhanced feedback with an acknowledgment message indicating a result of the performed decoding procedure for the received downlink message, the enhanced feedback indicating assistance information associated with the quality of service level for the received downlink message. The operations of 1220 may be performed according to the methods described herein. In some examples, aspects of the operations of 1220 may be performed by an enhanced feedback component as described with reference to FIGS. 4 through 7.

At 1225, the UE may transmit the acknowledgment message and the enhanced feedback for the acknowledgment message. The operations of 1225 may be performed according to the methods described herein. In some examples, aspects of the operations of 1225 may be performed by an acknowledgment component as described with reference to FIGS. 4 through 7.

Figure 13:
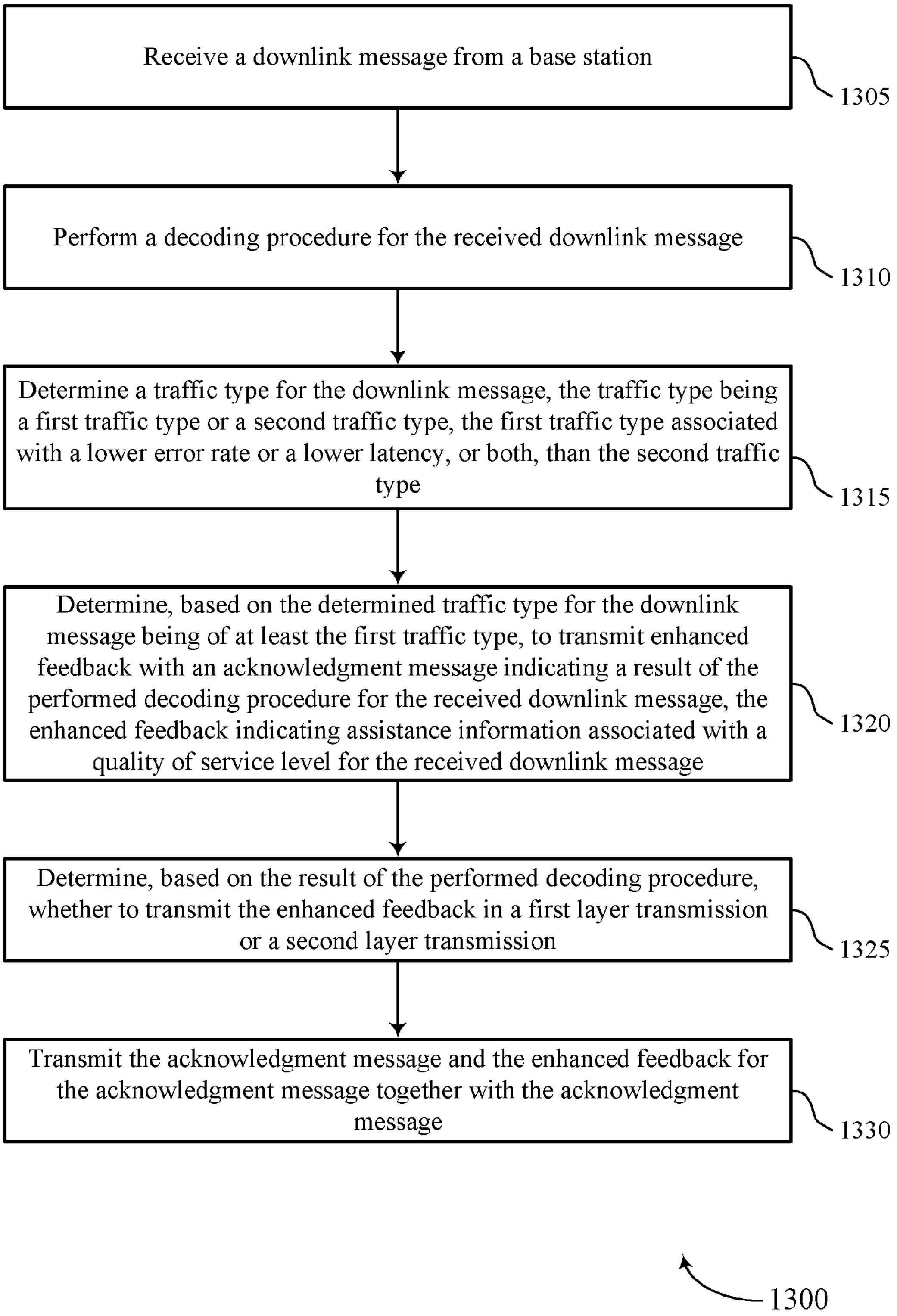

FIG. 13 shows a flowchart illustrating a method 1300 that supports enhanced decoding feedback for traffic type differentiation in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1305, the UE may receive a downlink message from a base station. The operations of 1305 may be performed according to the methods described herein. In some examples, aspects of the operations of 1305 may be performed by a downlink reception component as described with reference to FIGS. 4 through 7.

At 1310, the UE may perform a decoding procedure for the received downlink message. The operations of 1310 may be performed according to the methods described herein. In some examples, aspects of the operations of 1310 may be performed by a decoding component as described with reference to FIGS. 4 through 7.

At 1315, the UE may determine a traffic type for the downlink message, the traffic type being a first traffic type or a second traffic type, the first traffic type associated with a lower error rate or a lower latency, or both, than the second traffic type. The operations of 1315 may be performed according to the methods described herein. In some examples, aspects of the operations of 1315 may be performed by a traffic identification component as described with reference to FIGS. 4 through 7.

At 1320, the UE may determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with a quality of service level for the received downlink message. The operations of 1320 may be performed according to the methods described herein. In some examples, aspects of the operations of 1320 may be performed by an enhanced feedback component as described with reference to FIGS. 4 through 7.

At 1325, the UE may determine, based on the result of the performed decoding procedure, whether to transmit the enhanced feedback in a first layer transmission or a second layer transmission. The operations of 1325 may be performed according to the methods described herein. In some examples, aspects of the operations of 1325 may be performed by a layer determination component as described with reference to FIGS. 4 through 7.

At 1330, the UE may transmit the acknowledgment message and the enhanced feedback for the acknowledgment message together with the acknowledgment message. The operations of 1330 may be performed according to the methods described herein. In some examples, aspects of the operations of 1330 may be performed by an acknowledgment component as described with reference to FIGS. 4 through 7.

Figure 14:
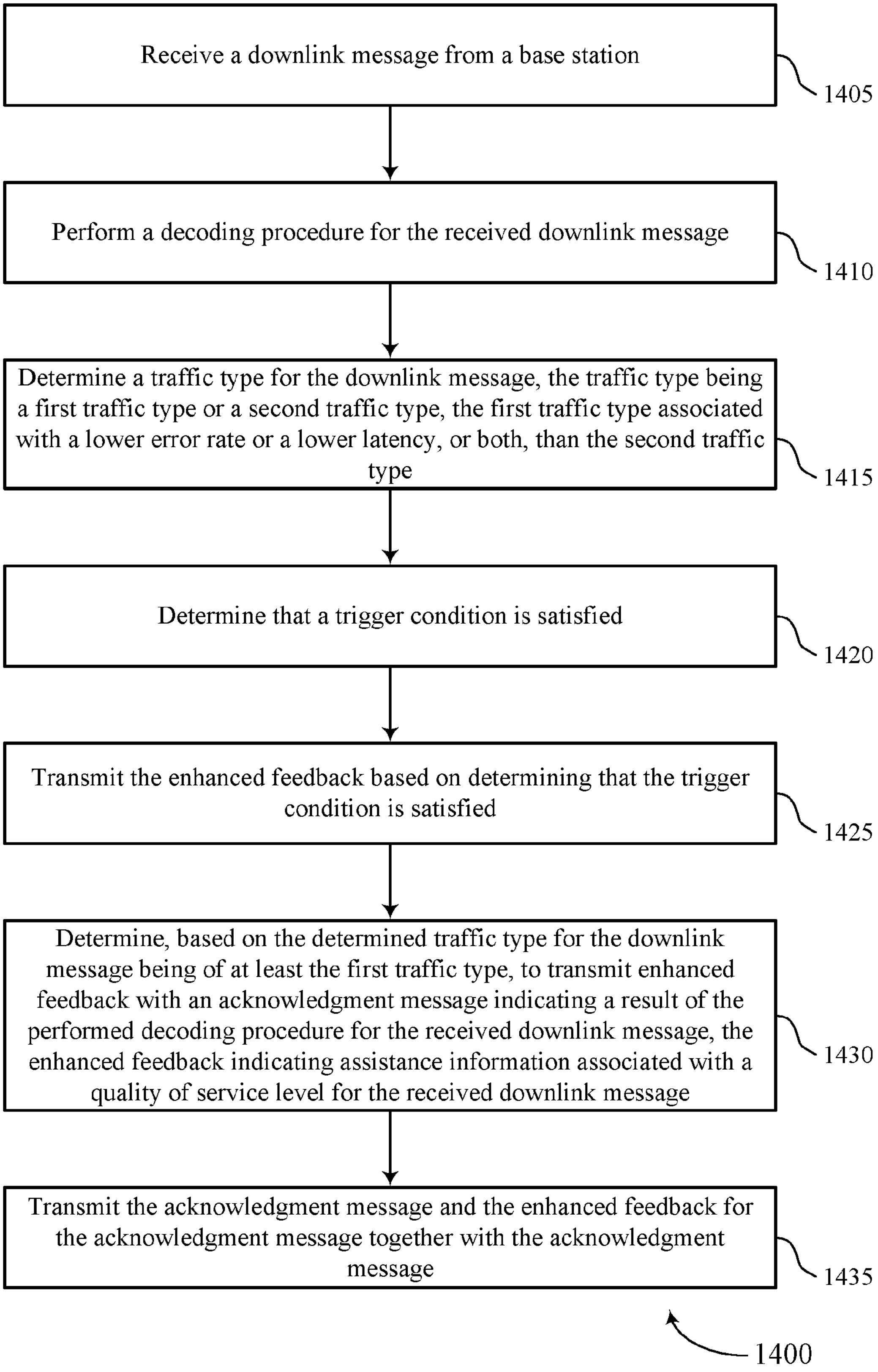

FIG. 14 shows a flowchart illustrating a method 1400 that supports enhanced decoding feedback for traffic type differentiation in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1405, the UE may receive a downlink message from a base station. The operations of 1405 may be performed according to the methods described herein. In some examples, aspects of the operations of 1405 may be performed by a downlink reception component as described with reference to FIGS. 4 through 7.

At 1410, the UE may perform a decoding procedure for the received downlink message. The operations of 1410 may be performed according to the methods described herein. In some examples, aspects of the operations of 1410 may be performed by a decoding component as described with reference to FIGS. 4 through 7.

At 1415, the UE may determine a traffic type for the downlink message, the traffic type being a first traffic type or a second traffic type, the first traffic type associated with a lower error rate or a lower latency, or both, than the second traffic type. The operations of 1415 may be performed according to the methods described herein. In some examples, aspects of the operations of 1415 may be performed by a traffic identification component as described with reference to FIGS. 4 through 7.

At 1420, the UE may determine that a trigger condition is satisfied. The operations of 1420 may be performed according to the methods described herein. In some examples, aspects of the operations of 1420 may be performed by a trigger condition component as described with reference to FIGS. 4 through 7.

At 1425, the UE may transmit the enhanced feedback based on determining that the trigger condition is satisfied. The operations of 1425 may be performed according to the methods described herein. In some examples, aspects of the operations of 1425 may be performed by a trigger condition component as described with reference to FIGS. 4 through 7.

At 1430, the UE may determine, based on the determined traffic type for the downlink message being of at least the first traffic type, to transmit enhanced feedback with an acknowledgment message indicating a result of the performed decoding procedure for the received downlink message, the enhanced feedback indicating assistance information associated with a quality of service level for the received downlink message. The operations of 1430 may be performed according to the methods described herein. In some examples, aspects of the operations of 1430 may be performed by an enhanced feedback component as described with reference to FIGS. 4 through 7.

At 1435, the UE may transmit the acknowledgment message and the enhanced feedback for the acknowledgment message together with the acknowledgment message. The operations of 1435 may be performed according to the methods described herein. In some examples, aspects of the operations of 1435 may be performed by an acknowledgment component as described with reference to FIGS. 4 through 7.

Figure 15:
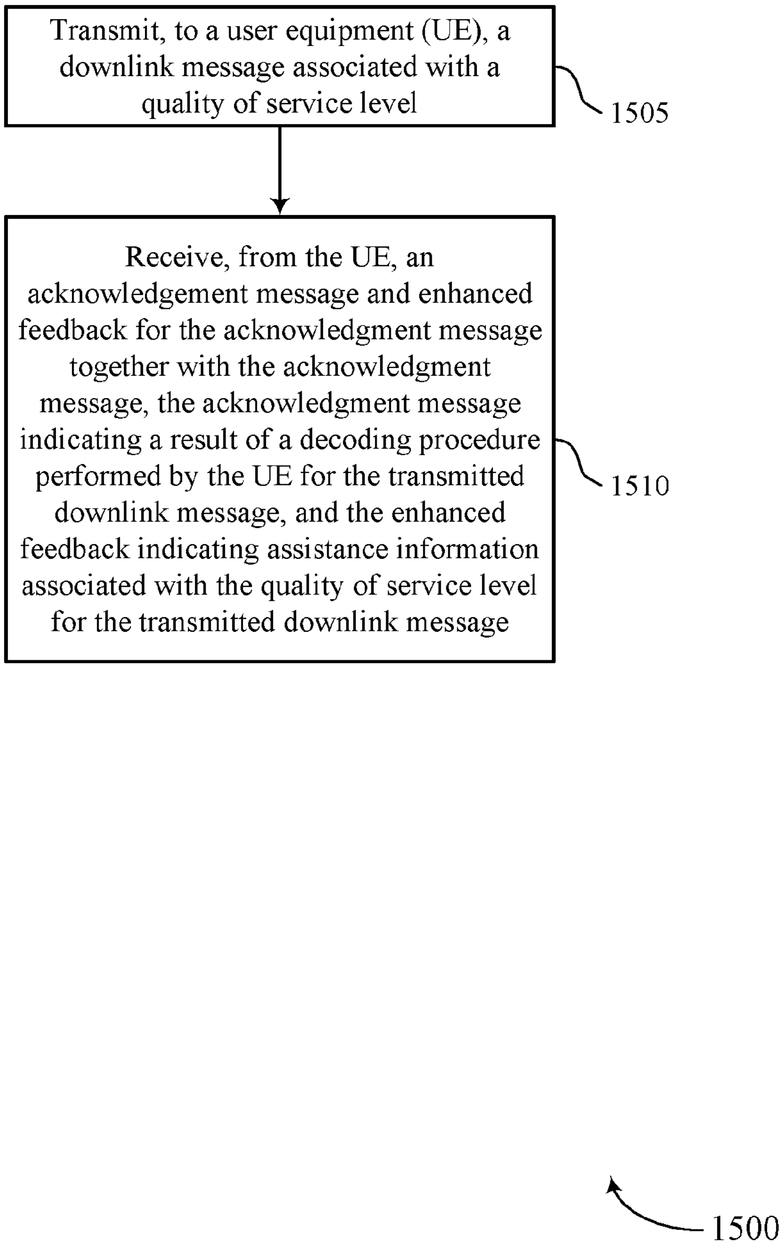

FIG. 15 shows a flowchart illustrating a method 1500 that supports enhanced decoding feedback for traffic type differentiation in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally, or alternatively, a base station may perform aspects of the functions described herein using special-purpose hardware.

At 1505, the base station may transmit, to a user equipment (UE), a downlink message associated with a quality of service level. The operations of 1505 may be performed according to the methods described herein. In some examples, aspects of the operations of 1505 may be performed by a downlink transmission component as described with reference to FIGS. 8 through 11.

At 1510, the base station may receive, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message. The operations of 1510 may be performed according to the methods described herein. In some examples, aspects of the operations of 1510 may be performed by a feedback reception component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspect 1: A method of wireless communication at a user equipment (UE), comprising: receiving a downlink message from a base station, performing a decoding procedure for the received downlink message, determining the downlink message has a traffic type associated with a quality of service level, determining, based at least in part on the traffic type for the downlink message, to transmit enhanced feedback with an acknowledgment message indicating a result of the performed decoding procedure for the received downlink message, the enhanced feedback indicating assistance information associated with the quality of service level for the received downlink message, and transmitting the acknowledgment message and the enhanced feedback for the acknowledgment message.

Aspect 2: The method of aspect 1, wherein the assistance information comprises channel quality information, or an estimated error rate, or a combination thereof.

Aspect 3: The method of any of aspects 1 or 2, wherein the first traffic type is different from a second traffic type, the second traffic type associated with a type of enhanced feedback that is different from the enhanced feedback associated with the acknowledgment message.

Aspect 4: The method of any of aspects 1 to 3, further comprising: determining, based at least in part on the result of the performed decoding procedure, whether to transmit the enhanced feedback in a first layer transmission or a second layer transmission.

Aspect 5: The method of aspect 4, further comprising: transmitting the enhanced feedback in the first layer based at least in part on the acknowledgment message being a negative acknowledgment message.

Aspect 6: The method of aspect 4, further comprising: transmitting the enhanced feedback in the second layer based at least in part on the acknowledgment message being a positive acknowledgment message.

Aspect 7: The method of aspect 4, wherein the first layer is a physical layer and the second layer is a medium access control layer.

Aspect 8: The method of any of aspects 1 to 7, further comprising: transmitting periodically, for downlink messages of the first traffic type, enhanced feedback indicating assistance information associated with the quality of service level.

Aspect 9: The method of any of aspects 1 to 8, further comprising: transmitting, for each downlink message received from the base station, an enhanced feedback associated with the downlink message.

Aspect 10: The method of any of aspects 1 to 9, further comprising: receiving an indication of a periodic configuration for transmitting enhanced feedback, wherein the enhanced feedback associated with the downlink message is transmitted according to the periodic configuration.

Aspect 11: The method of aspect 10, further comprising: receiving an indication to activate the periodic configuration, wherein the enhanced feedback associated with the downlink message is transmitted according to the periodic configuration based at least in part on the received indication to activate the periodic configuration.

Aspect 12: The method of aspect 11, wherein receiving the indication to activate the periodic configuration comprises receiving a downlink control information message or a medium access control control element comprising the indication to activate the periodic configuration.

Aspect 13: The method of any of aspects 1 to 12, further comprising: determining that a trigger condition is satisfied, and transmitting the enhanced feedback based at least in part on determining that the trigger condition is satisfied.

Aspect 14: The method of aspect 13, further comprising: determining that an error rate threshold for the first traffic type is satisfied, wherein the trigger condition comprises the determining that the error rate threshold is satisfied.

Aspect 15: The method of aspect 14, further comprising: transmitting the enhanced feedback based at least in part on determining that the error rate threshold is satisfied, wherein the error rate threshold indicates a downlink message with a lowest error rate.

Aspect 16: The method of aspect 13, further comprising: receiving, from the base station, a request for the UE to transmit enhanced feedback, and determining that the trigger condition is satisfied based at least in part on the received request.

Aspect 17: The method of any of aspects 1 to 16, further comprising: receiving a downlink control information message from the base station, and determining the first traffic type based at least in part on the quality of service level indicated by the downlink control information message.

Aspect 18: The method of aspect 17, wherein the enhanced feedback comprises an indication of the quality of service level indicated by the downlink control information message.

Aspect 19: The method of any of aspects 1 to 18, further comprising: determining a quality of service level for each logical channel of a plurality of logical channels multiplexed in the downlink message, and determining the first traffic type based at least in part on a highest quality of service level among the determined quality of service levels.

Aspect 20: The method of any of aspects 1 to 19, further comprising: identifying a first set of resources for enhanced feedbacks of the first traffic type, and a second set of resources for feedback messages of a second traffic type, and transmitting the enhanced feedback on the first set of resources.

Aspect 21: The method of any of aspects 1 to 20, wherein the enhanced feedback comprises an indication of the first traffic type.

Aspect 22: The method of aspect 21, wherein the indication comprises a logical channel identifier, a quality of service flow identifier, a fifth-generation quality of service identifier, or a combination thereof.

Aspect 23: The method of aspect 22, further comprising: transmitting the indication in a medium access control layer.

Aspect 24. A method for wireless communications at a base station, comprising: transmitting, to a user equipment (UE), a downlink message associated with a quality of service level, and receiving, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating assistance information associated with the quality of service level for the transmitted downlink message.

Aspect 25. The method of aspect 24, wherein the assistance information comprises channel quality information, or an estimated error rate, or a combination thereof.

Aspect 26. The method of aspect 24 or 25, wherein the first traffic type is different from a second traffic type, the second traffic type associated with a second type of enhanced feedback that is different from the enhanced feedback.

Aspect 27. The method of any of aspects 24 to 26, further comprising: receiving the enhanced feedback in a first layer transmission or a second layer transmission.

Aspect 28. The method of aspect 27, further comprising: receiving the enhanced feedback in the first layer, wherein the acknowledgment message is a negative acknowledgment message.

Aspect 29. The method of aspect 27, further comprising: receiving the enhanced feedback in the second layer, wherein the acknowledgment message is a positive acknowledgment message.

Aspect 30. The method of aspect 27, wherein the first layer is a physical layer and the second layer is a medium access control layer.

Aspect 31. The method of any of aspects 24 to 30, further comprising: receiving periodically, for downlink messages of the first traffic type, enhanced feedbacks indicating assistance information associated with the quality of service level.

Aspect 32. The method of any of aspects 24 to 31, further comprising: receiving, for each downlink message transmitted by the base station, enhanced feedback associated with the downlink message.

Aspect 33. The method of any of aspects 24 to 32, further comprising: transmitting an indication of a periodic configuration for transmitting enhanced feedback, wherein the enhanced feedback associated with the downlink message is received according to the periodic configuration.

Aspect 34. The method of aspect 33, further comprising: transmitting an indication to activate the periodic configuration, wherein the enhanced feedback associated with the downlink message is received according to the periodic configuration based at least in part on the received indication to activate the periodic configuration.

Aspect 35. The method of aspect 34, wherein transmitting the indication to activate the periodic configuration comprises transmitting a downlink control information message or a medium access control control element comprising the indication to activate the periodic configuration.

Aspect 36. The method of any of aspects 24 to 35, further comprising: receiving the enhanced feedback based at least in part on a satisfaction of a trigger condition.

Aspect 37. The method of aspect 36, wherein the trigger condition is an error rate threshold.

Aspect 38. The method of aspect 37, wherein the error rate threshold indicates the downlink message with a lowest error rate.

Aspect 39. The method of aspect 36, further comprising: transmitting to the UE, a request for the UE to transmit enhanced feedback, wherein the trigger condition comprises the request.

Aspect 40. The method of any of aspects 24 to 39, further comprising: transmitting a downlink control information message to the UE, wherein the quality of service level of the first traffic type is indicated by the downlink control information message.

Aspect 41. The method of aspect 40, wherein the enhanced feedback comprises an indication of the quality of service level indicated by the downlink control information message.

Aspect 42. The method of any of aspects 24 to 41, further comprising: receiving the enhanced feedback on a first set of resources, wherein the first set of resources correspond to the first traffic type, wherein the first set of resources are different from a second set of resources for enhanced feedbacks of a second traffic type.

Aspect 43. The method of any of aspects 24 to 42, wherein the enhanced feedback comprises an indication of the first traffic type.

Aspect 44. The method of aspect 43, wherein the indication comprises a logical channel identifier, a quality of service flow identifier, a fifth-generation quality of service identifier, or a combination thereof.

Aspect 45. The method of aspect 44, further comprising: receiving the indication in a medium access control layer.

Aspect 46: An apparatus comprising at least one means for performing a method of any of aspects 1 to 23.

Aspect 47: An apparatus for wireless communications comprising a processor; memory in electronic communication with the processor; and instructions stored in the memory and executable by the processor to cause the apparatus to perform a method of any of aspects 1 to 23.

Aspect 48: A non-transitory computer-readable medium storing code for wireless communications, the code comprising instructions executable by a processor to perform a method of any of aspects 1 to 23.

Aspect 49: An apparatus comprising at least one means for performing a method of any of aspects 24 to 45.

Aspect 50: An apparatus for wireless communications comprising a processor; memory in electronic communication with the processor; and instructions stored in the memory and executable by the processor to cause the apparatus to perform a method of any of aspects 24 to 45.

Aspect 51: A non-transitory computer-readable medium storing code for wireless communications, the code comprising instructions executable by a processor to perform a method of any of aspects 24 to 45.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
- one or more processors, one or more memories coupled with the one or more processors; and
- instructions stored in the one or more memories and executable by the one or more processors to cause the apparatus to:
- receive a downlink message from a network entity;
- perform a decoding procedure for the received downlink message;
- determine the downlink message has a traffic type associated with a quality of service level;
- and
- transmit, based at least in part on the traffic type, an acknowledgment message and an enhanced feedback for the acknowledgment message, wherein the acknowledgment message indicates a result of the performed decoding procedure for the received downlink message, wherein the enhanced feedback indicates an estimated error rate corresponding to the downlink message.

2. The apparatus of claim 1, wherein the traffic type is different from a second traffic type, the second traffic type associated with a type of enhanced feedback that is different from the enhanced feedback associated with the acknowledgment message.

3. The apparatus of claim 1, wherein the instructions are further executable by the one or more processors to cause the apparatus to:
- determine, based at least in part on the result of the performed decoding procedure, whether to transmit the enhanced feedback in a first layer transmission or a second layer transmission.

4. The apparatus of claim 3, wherein the instructions are further executable by the one or more processors to cause the apparatus to:
- transmit the enhanced feedback in the first layer based at least in part on the acknowledgment message being a negative acknowledgment message.

5. The apparatus of claim 3, wherein the instructions are further executable by the one or more processors to cause the apparatus to:
- transmit the enhanced feedback in the second layer based at least in part on the acknowledgment message being a positive acknowledgment message.

6. The apparatus of claim 3, wherein the first layer is a physical layer and the second layer is a medium access control layer.

7. The apparatus of claim 1, wherein the instructions are further executable by the one or more processors to cause the apparatus to:
- transmit periodically, for downlink messages of the traffic type, the enhanced feedback.

8. The apparatus of claim 1, wherein the instructions are further executable by the one or more processors to cause the apparatus to:
- transmit, for each downlink message received from the network entity, an enhanced feedback associated with the downlink message.

9. The apparatus of claim 1, wherein the instructions are further executable by the one or more processors to cause the apparatus to:

receive an indication of a periodic configuration for transmitting enhanced feedback, wherein the enhanced feedback associated with the downlink message is transmitted according to the periodic configuration.

10. The apparatus of claim 9, wherein the instructions are further executable by the one or more processors to cause the apparatus to:

receive an indication to activate the periodic configuration, wherein the enhanced feedback associated with the downlink message is transmitted according to the periodic configuration based at least in part on the received indication to activate the periodic configuration.

11. The apparatus of claim 10, wherein the instructions to receive the indication to activate the periodic configuration are executable by the one or more processors to cause the apparatus to:

receive a downlink control information message or a medium access control control element comprising the indication to activate the periodic configuration.

12. The apparatus of claim 1, wherein the instructions are further executable by the one or more processors to cause the apparatus to:

determine that a trigger condition is satisfied; and transmit the enhanced feedback based at least in part on determining that the trigger condition is satisfied.

13. The apparatus of claim 12, wherein the instructions are further executable by the one or more processors to cause the apparatus to:

determine that an error rate threshold for the traffic type is satisfied, wherein the trigger condition comprises the determining that the error rate threshold is satisfied.

14. The apparatus of claim 13, wherein the instructions are further executable by the one or more processors to cause the apparatus to:

transmit the enhanced feedback based at least in part on determining that the error rate threshold is satisfied, wherein the error rate threshold indicates a downlink message with a lowest error rate.

15. The apparatus of claim 12, wherein the instructions are further executable by the one or more processors to cause the apparatus to:

receive, from the network entity, a request for the UE to transmit enhanced feedback; and determine that the trigger condition is satisfied based at least in part on the received request.

16. The apparatus of claim 1, wherein the instructions are further executable by the one or more processors to cause the apparatus to:

receive a downlink control information message from the network entity; and determine the traffic type based at least in part on the quality of service level indicated by the downlink control information message.

17. The apparatus of claim 16, wherein the enhanced feedback comprises an indication of the quality of service level indicated by the downlink control information message.

18. The apparatus of claim 1, wherein the instructions are further executable by the one or more processors to cause the apparatus to:

determine a quality of service level for each logical channel of a plurality of logical channels multiplexed in the downlink message; and determine the traffic type based at least in part on a highest quality of service level among the determined quality of service levels.

19. The apparatus of claim 1, wherein the instructions are further executable by the one or more processors to cause the apparatus to:

identify a first set of resources for enhanced feedbacks of the traffic type, and a second set of resources for feedback messages of a second traffic type; and transmit the enhanced feedback on the first set of resources.

20. The apparatus of claim 1, wherein the enhanced feedback comprises an indication of the traffic type.

21. The apparatus of claim 20, wherein the indication comprises a logical channel identifier, a quality of service flow identifier, a fifth-generation quality of service identifier, or a combination thereof.

22. The apparatus of claim 21, wherein the instructions are further executable by the one or more processors to cause the apparatus to:

transmit the indication in a medium access control layer.

23. An apparatus for wireless communications at a network entity, comprising:

one or more processors, one or more memories coupled with the one or more processors; and instructions stored in the one or more memories and executable by the one or more processors to cause the apparatus to:

transmit, to a user equipment (UE), a downlink message associated with a quality of service level; and receive, from the UE, an acknowledgement message and an enhanced feedback for the acknowledgment message together with the acknowledgment message, the acknowledgment message indicating a result of a decoding procedure performed by the UE for the transmitted downlink message, and the enhanced feedback indicating an estimated error rate corresponding to the downlink message.

24. The apparatus of claim 23, wherein a traffic type of the downlink message is different from a second traffic type, the second traffic type associated with a second type of enhanced feedback that is different from the enhanced feedback.

25. The apparatus of claim 23, wherein the instructions are further executable by the one or more processors to cause the apparatus to:

receive the enhanced feedback in a first layer transmission or a second layer transmission.

26. The apparatus of claim 23, wherein the instructions are further executable by the one or more processors to cause the apparatus to:

receive the enhanced feedback based at least in part on a satisfaction of a trigger condition.

27. A method for wireless communications at a user equipment (UE), comprising:

receiving a downlink message from a network entity;

performing a decoding procedure for the received downlink message;

determining the downlink message has a traffic type associated with a quality of service level;

and transmitting, based at least in part on the traffic type, an acknowledgment message and an enhanced feedback for the acknowledgment message, wherein the acknowledgment message indicates a result of the performed decoding procedure for the received downlink message, wherein the enhanced feedback indicates an estimated error rate corresponding to the downlink message.

28. A method for wireless communications at a network entity, comprising:

transmitting, to a user equipment (UE), a downlink message associated with a quality of service level; and receiving, from the UE, an acknowledgement message and enhanced feedback for the acknowledgment message together with the acknowledgment message, the acknowledgment message indicating a result of a decoding procedure performed by the UE for the transmitted downlink message, and the enhanced feedback indicating an estimated error rate corresponding to the downlink message.

* * * * *